INVENTORS
OWEN L. GORE
LEO. C. WILLIAMS
BY
Bauer and Seymour
ATTORNEYS

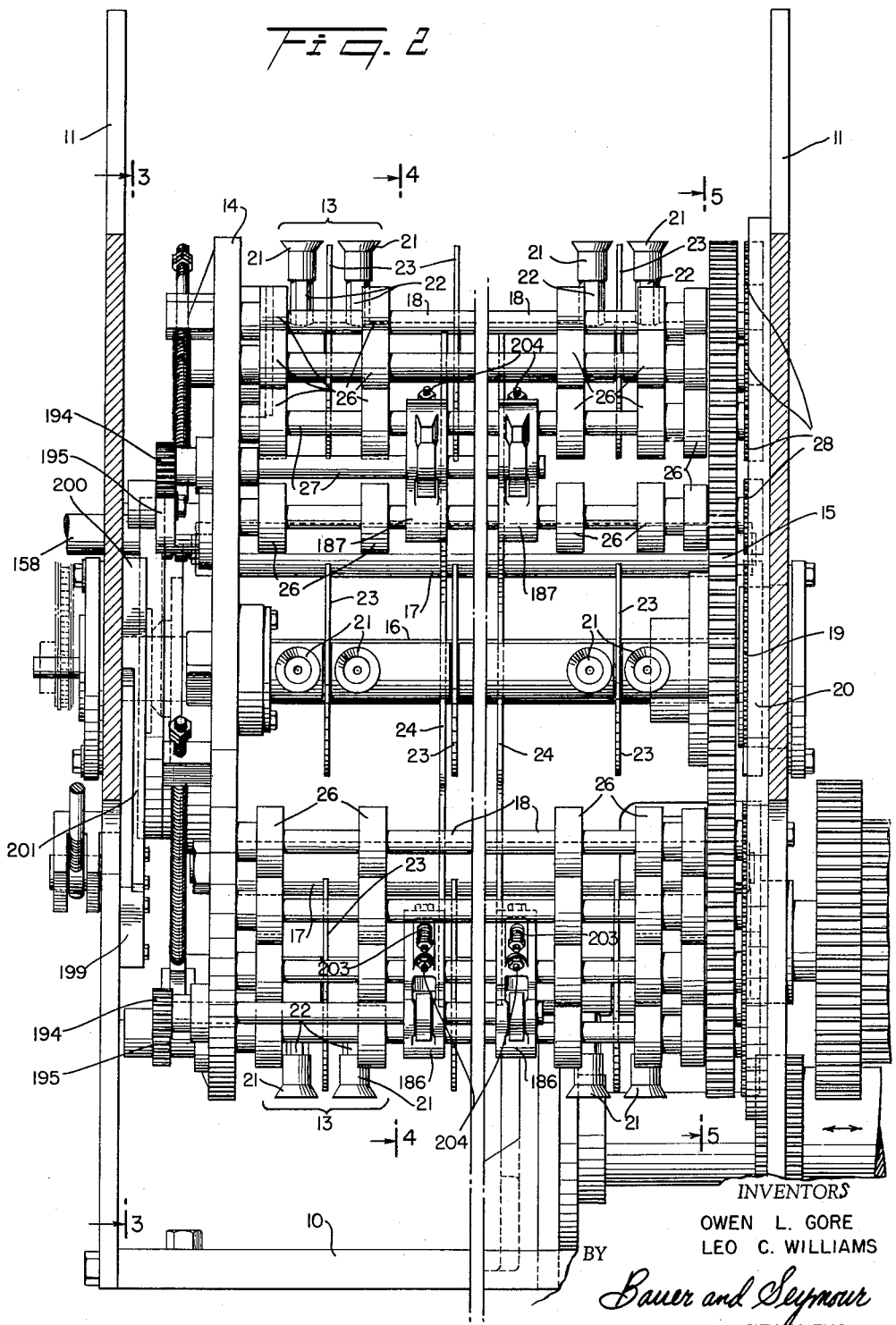

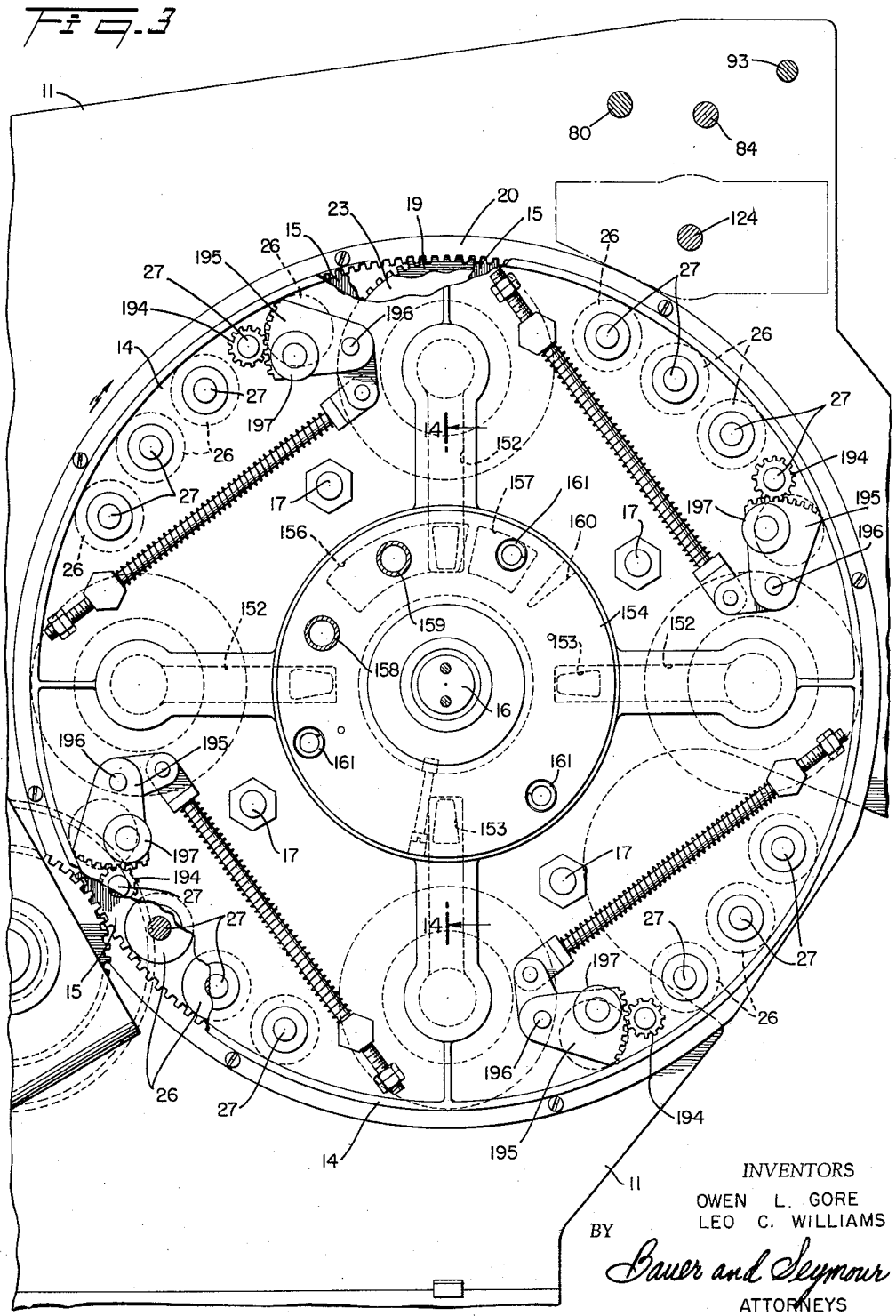

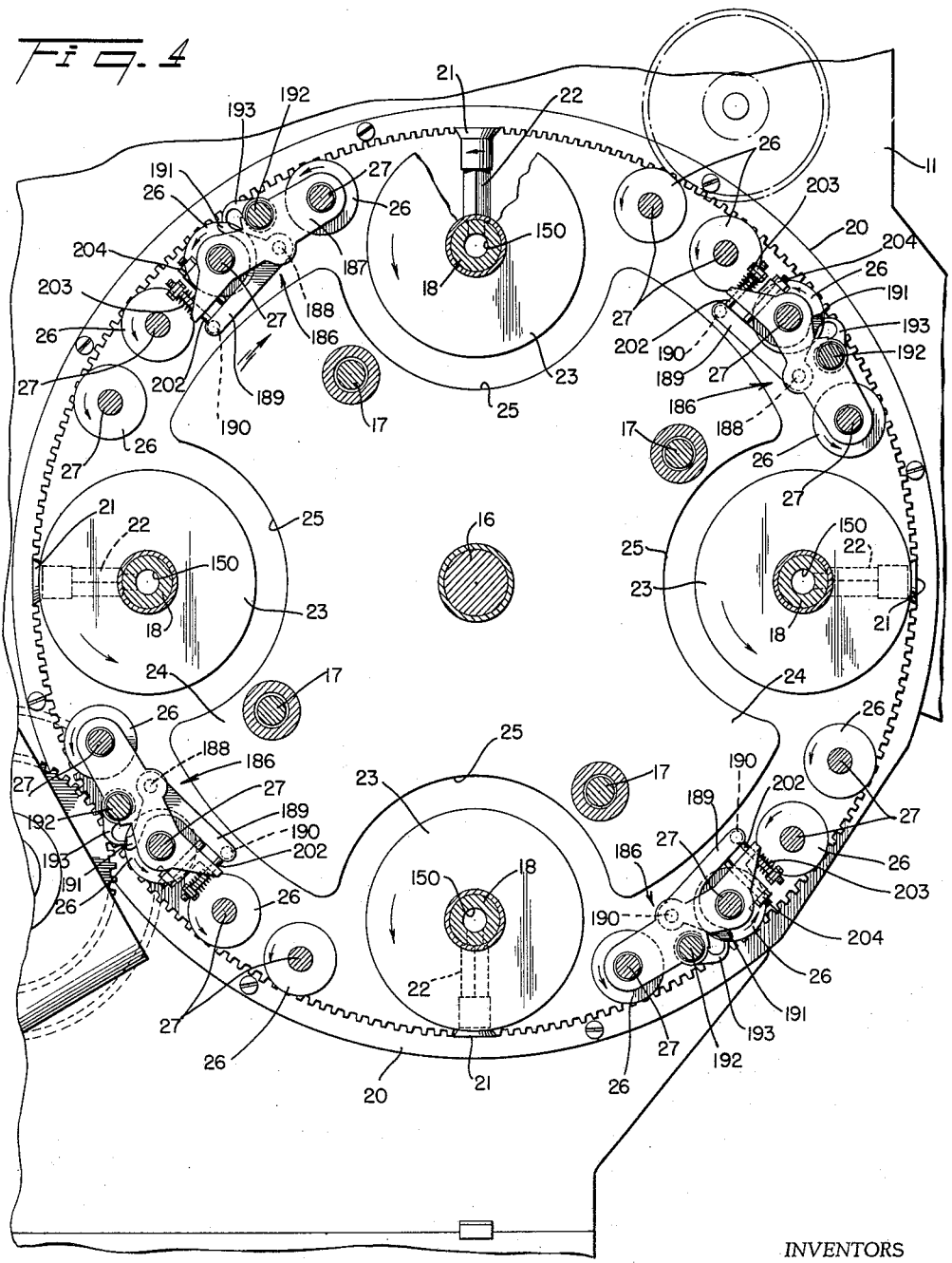

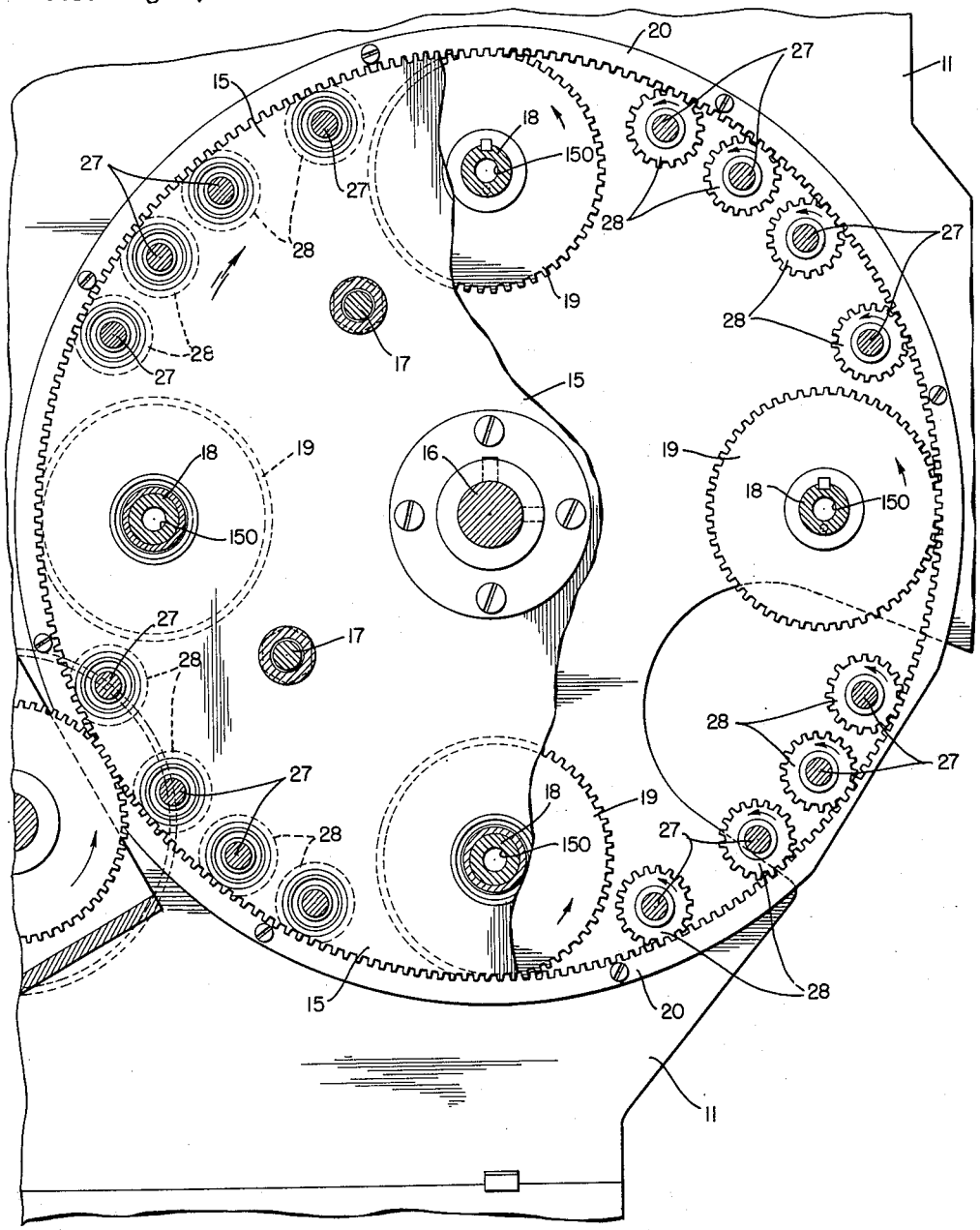

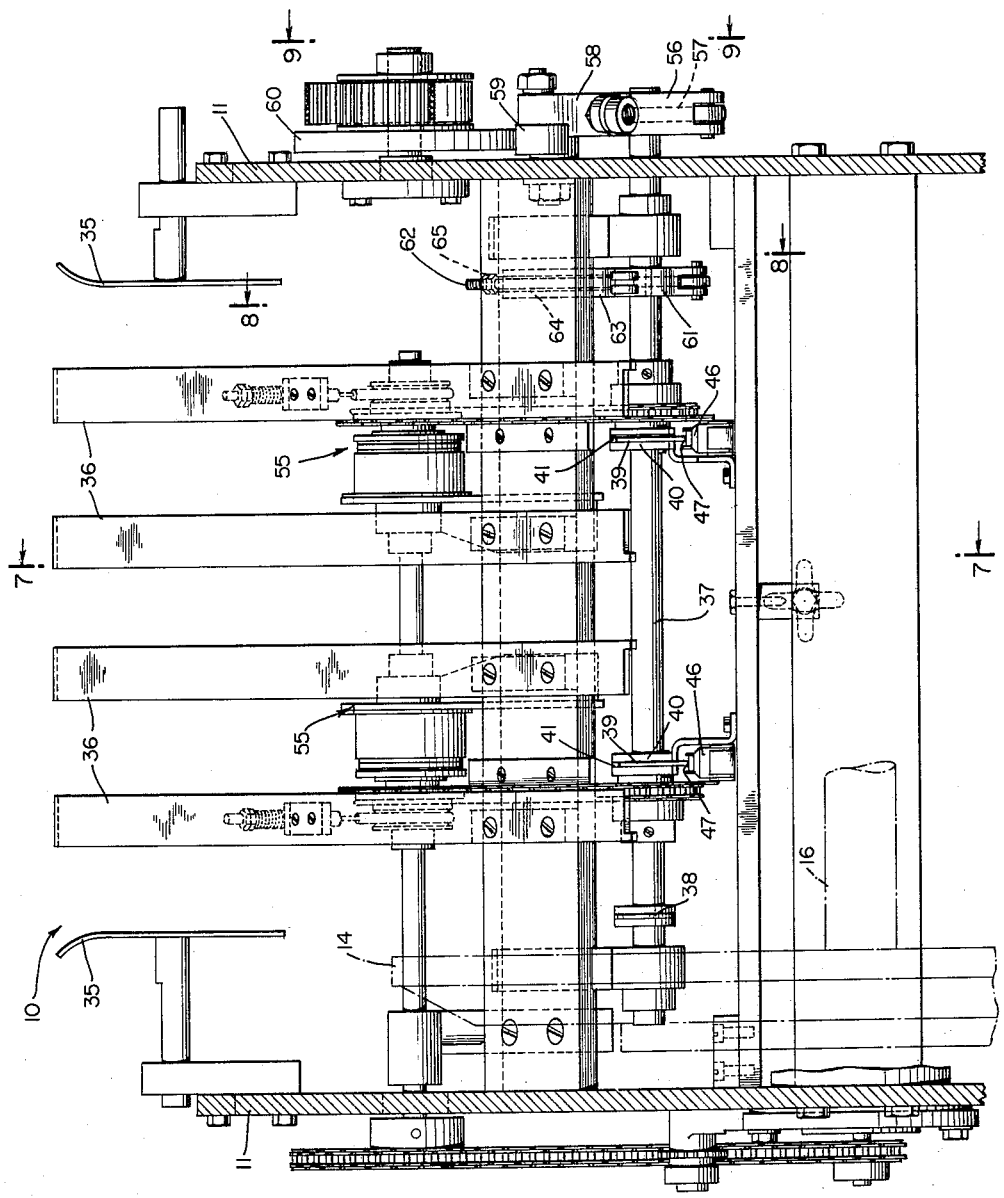

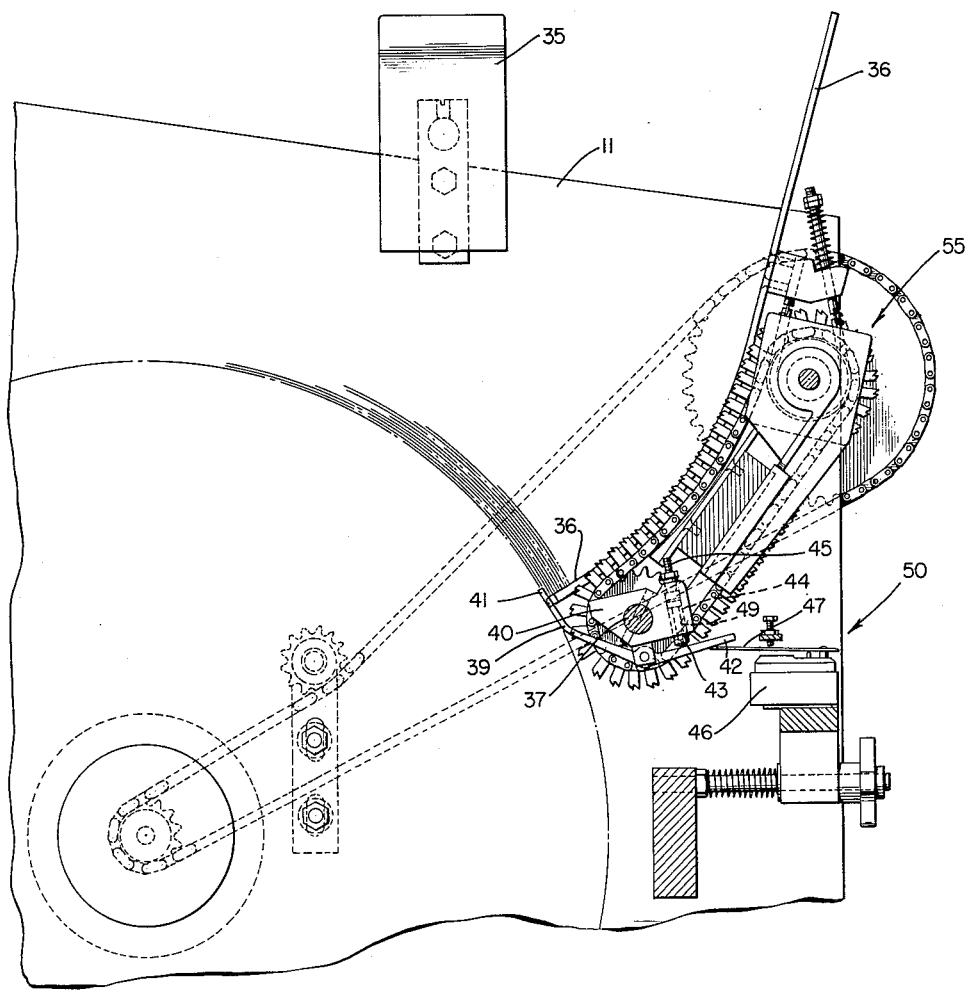

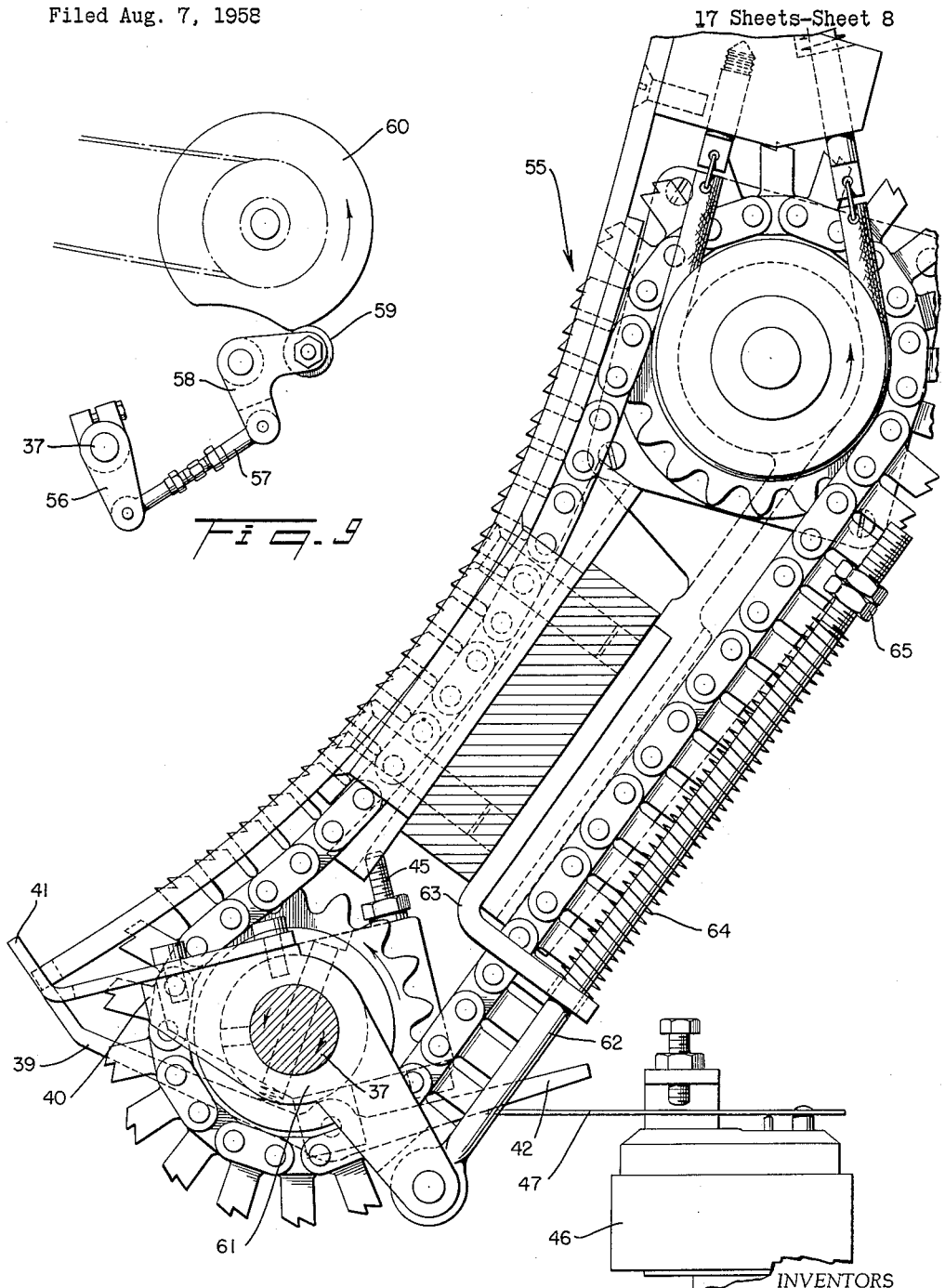

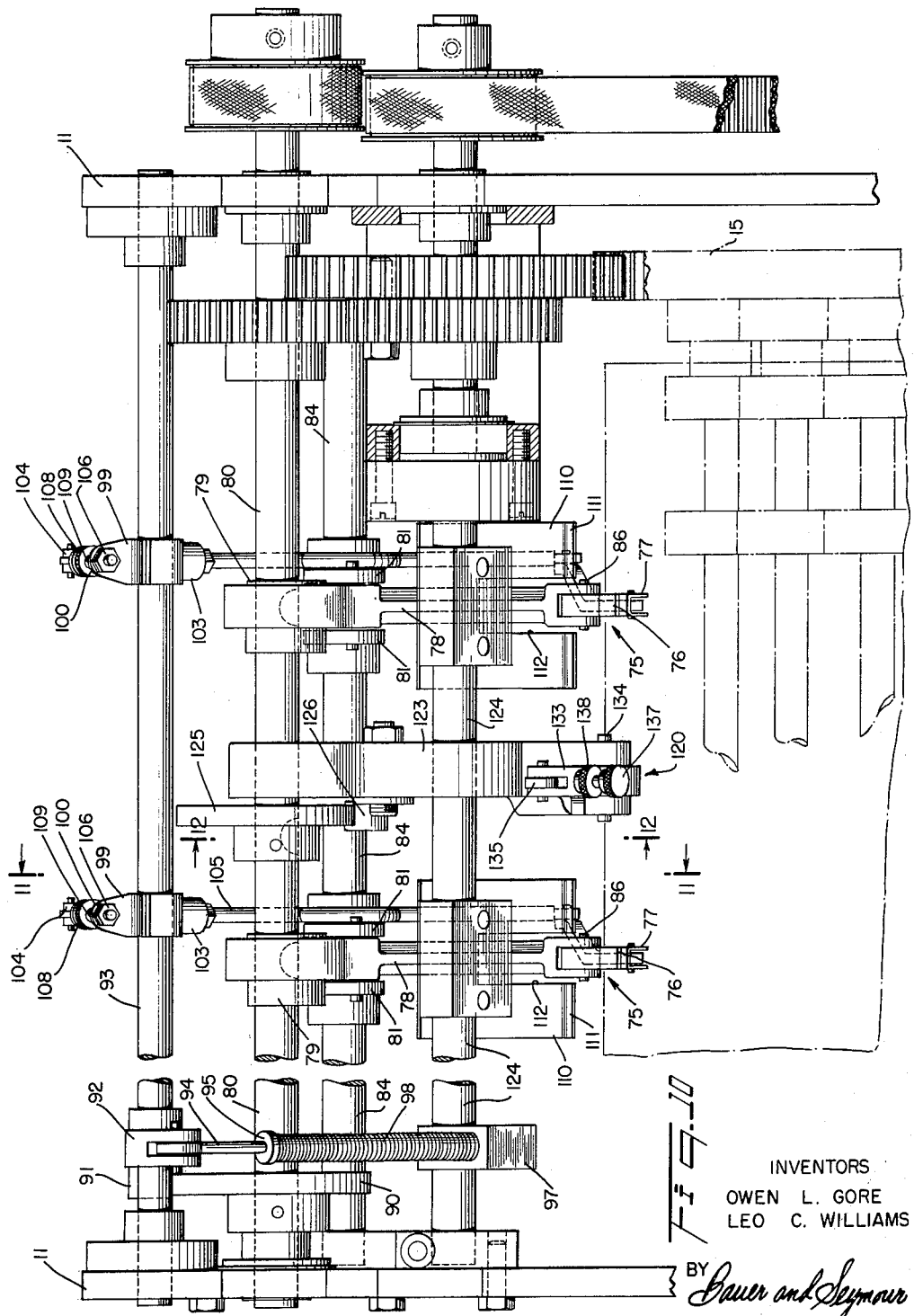

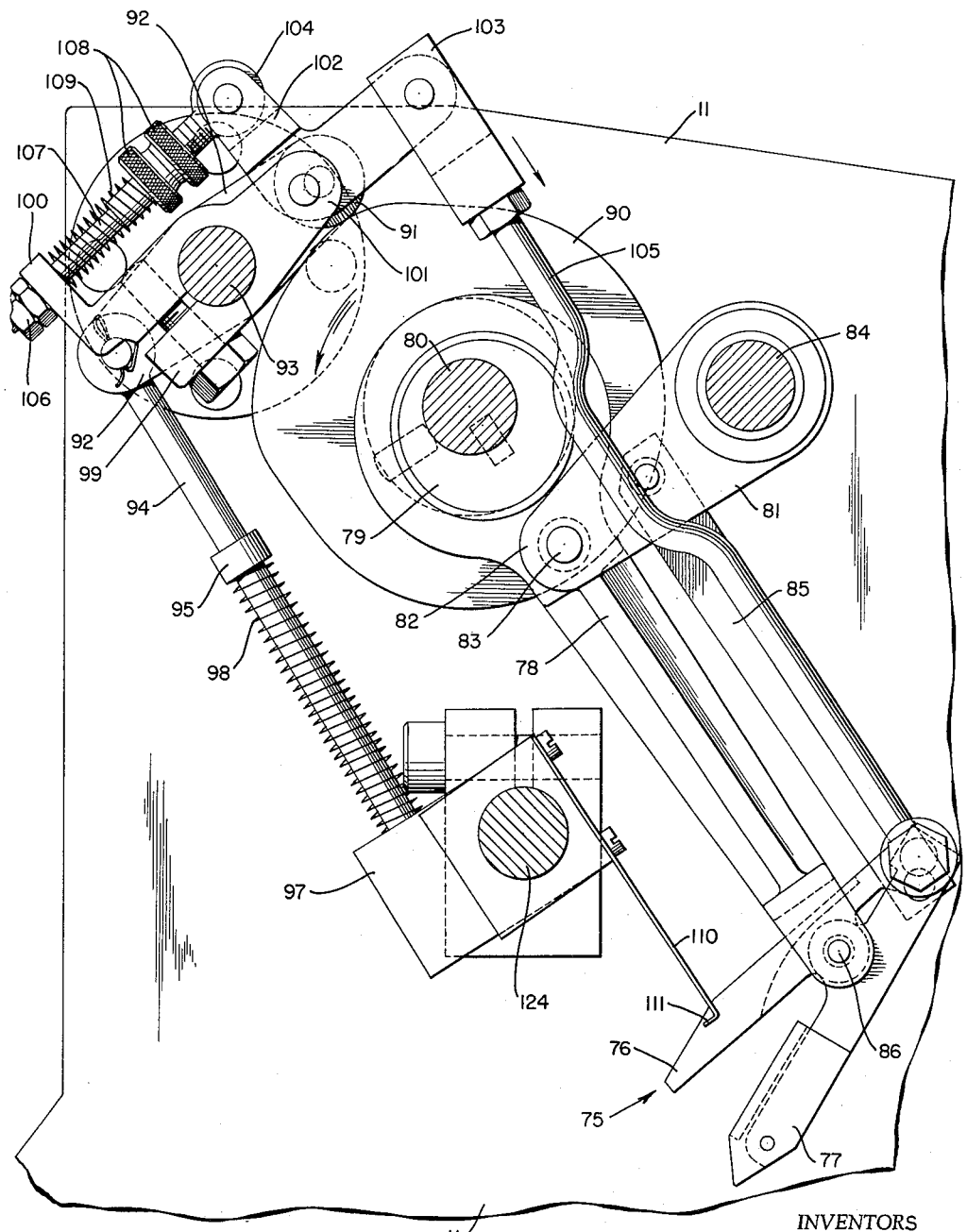

May 14, 1963  O. L. GORE ET AL  3,089,693
SIGNATURE HANDLING APPARATUS
Filed Aug. 7, 1958  17 Sheets-Sheet 11

INVENTORS
OWEN L. GORE
LEO C. WILLIAMS
BY
Bauer and Seymour
ATTORNEYS

May 14, 1963 O. L. GORE ET AL 3,089,693
SIGNATURE HANDLING APPARATUS
Filed Aug. 7, 1958 17 Sheets-Sheet 13

INVENTORS
OWEN L. GORE
LEO C. WILLIAMS
BY Bauer and Seymour
ATTORNEYS

INVENTORS
OWEN L. GORE
LEO C. WILLIAMS
BY Bauer and Seymour
ATTORNEYS

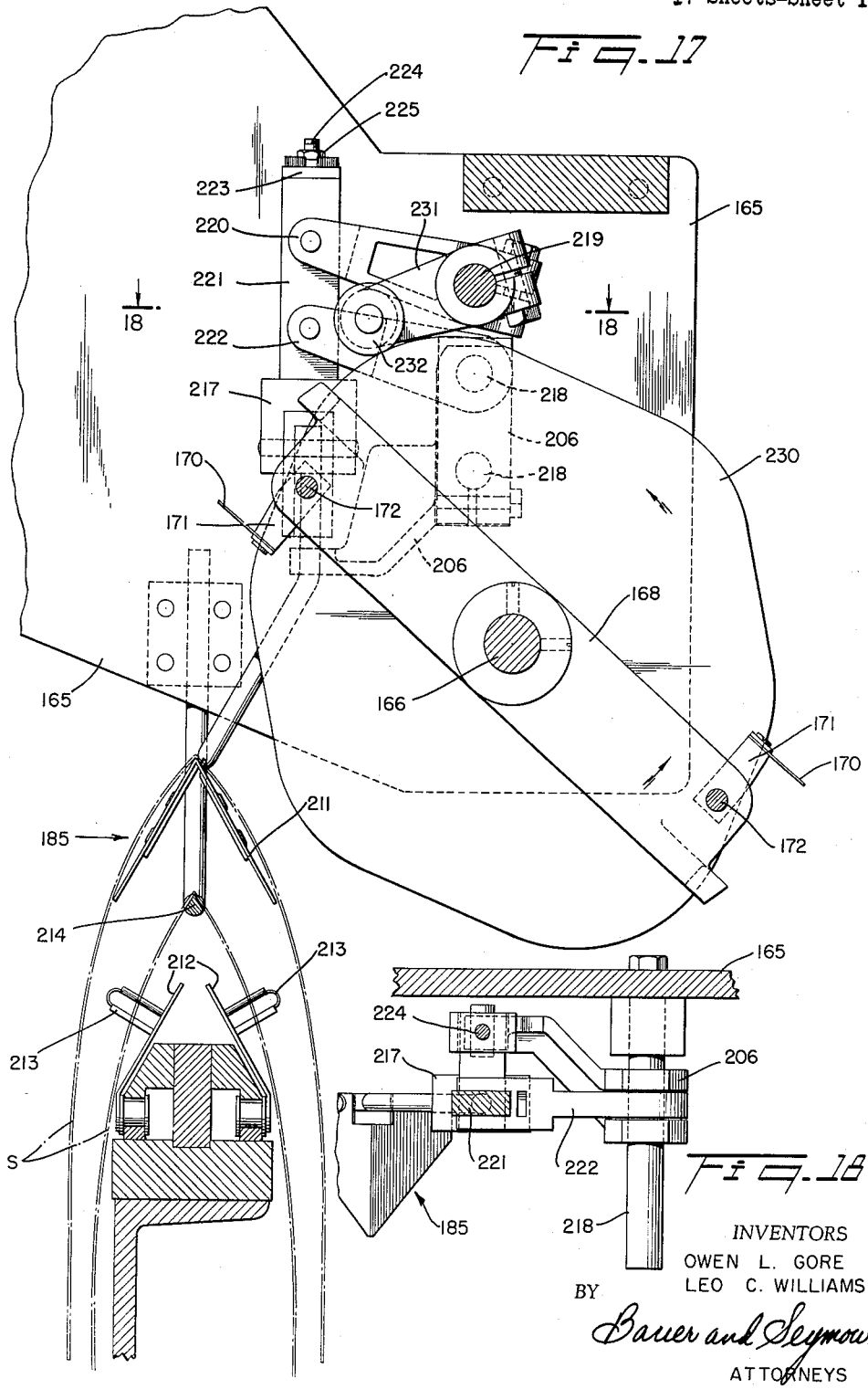

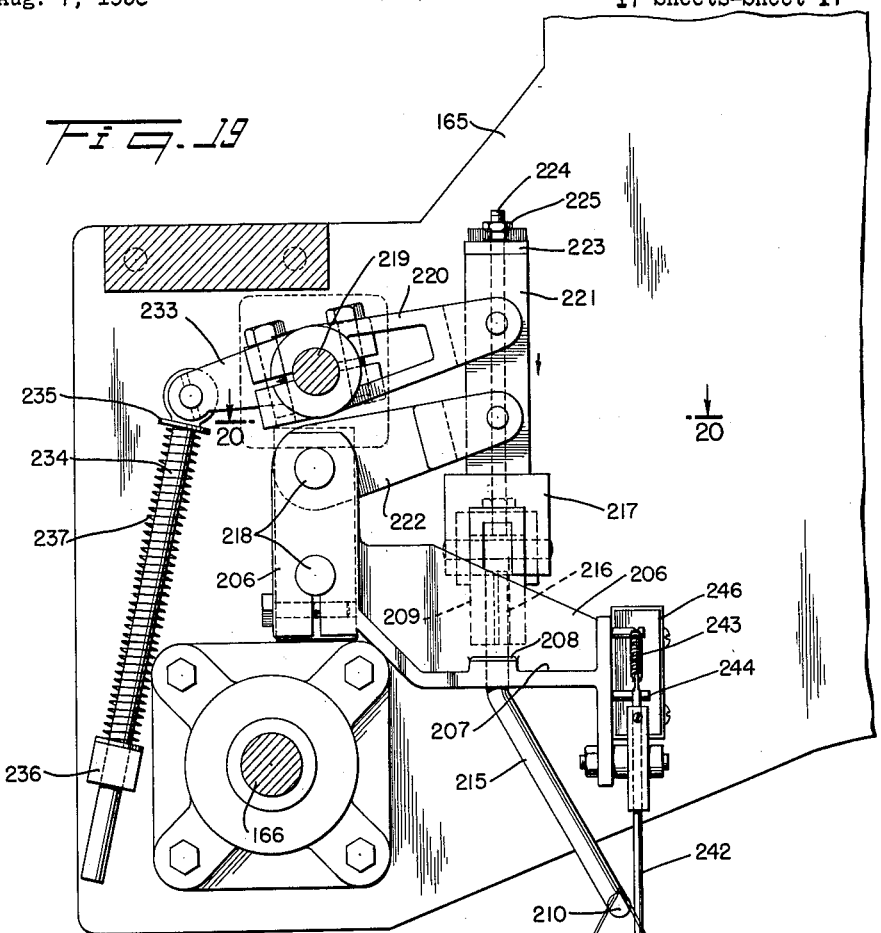
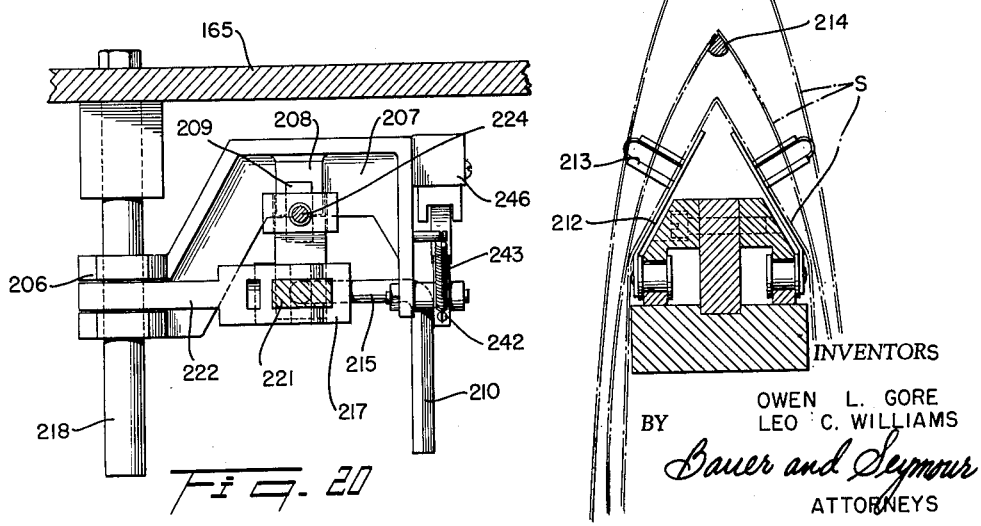

3,089,693
SIGNATURE HANDLING APPARATUS
Owen L. Gore, Hillsdale, N.J., and Leo C. Williams, Pearl River, N.Y., assignors to Miehle-Goss-Dexter, Incorporated, Chicago, Ill., a corporation of Delaware
Filed Aug. 7, 1958, Ser. No. 753,733
33 Claims. (Cl. 270—54)

This invention relates to a signature collating apparatus and more specifically to a method and an apparatus for feeding signatures in rapid succession from a series of hoppers to a conveyor where the signatures are gathered together to form a completed book, magazine or the like.

One object of the present invention is to provide a signature collating apparatus of new and improved construction which is efficient, dependable and rapid in operation, rugged in structure and having a minimum of parts, which requires substantially less space for its installation than signature collating apparatuses of the same general character heretofore known.

Another object of the present invention is to rapidly feed signatures in straddlewise fashion to a conveyor from a series of supply hoppers and in substantially a continuous stream and wherein the signatures from each of the hoppers will be in proper assembled relation on the conveyor.

Another object of the invention is to provide a new and novel apparatus wherein signatures are transferred from a supply hopper to a straddlewise position on a conveyor in a rapid and substantially continuous stream.

Another object is to provide a new and novel means to control the removal of each signature from a supply thereof.

Another object is to provide a new and novel mechanism to remove each signature from a pile thereof and to straighten and hold the same preparatory to opening the leaves for depositing on a saddle.

A still further object is to provide a new and improved mechanism for opening the leaves of each signature to deposit the same in straddle fashion on a conveyor with the folded edge of the signature across the top of the conveyor and the signature leaves hanging downwardly on each side thereof.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a side elevational view showing the general arrangement of the various parts of the signature feeding mechanism together with the drive means therefor;

FIG. 2 is a cross sectional view of the planetary feeder assembly taken along line 2—2 of FIG. 1;

FIG. 3 is a side elevational view taken along line 3—3 of FIG. 2 and showing the mechanism for operating the signature leaf gripping means and the mechanism for controlling the suction in each series or row of suction cups;

FIG. 4 is a side elevational view taken along line 4—4 of FIG. 2 and showing one of the mechanisms for gripping a leaf of the signature after it has been removed from the planetary feeder and straightened;

FIG. 5 is a side elevational view taken along line 5—5 of FIG. 2 and showing the gear arrangement for rotating the signature supporting and transfer means in a planetary orbit as well as in an orbital path;

FIG. 6 is a cross sectional view of the signature hopper and pile governor assembly taken along line 6—6 of FIG. 1;

FIG. 7 is a side elevational view taken along line 7—7 of FIG. 6 showing the signature feeling and pile lift fingers;

FIG. 8 is an enlarged side elevational view taken along line 8—8 of FIG. 6 showing the hopper feed mechanism;

FIG. 9 is a fragmentary side elevational view of the mechanism for controlling the movement of the signature pile lift fingers and the signature feeling fingers taken along line 9—9 of FIG. 6;

FIG 10 is a cross sectional view of the signature straightening and holding mechanism taken along line 10—10 of FIG 1;

FIG. 11 is a side elevational view of the signature straightening mechanism taken along line 11—11 of FIG. 10;

Figure 1:
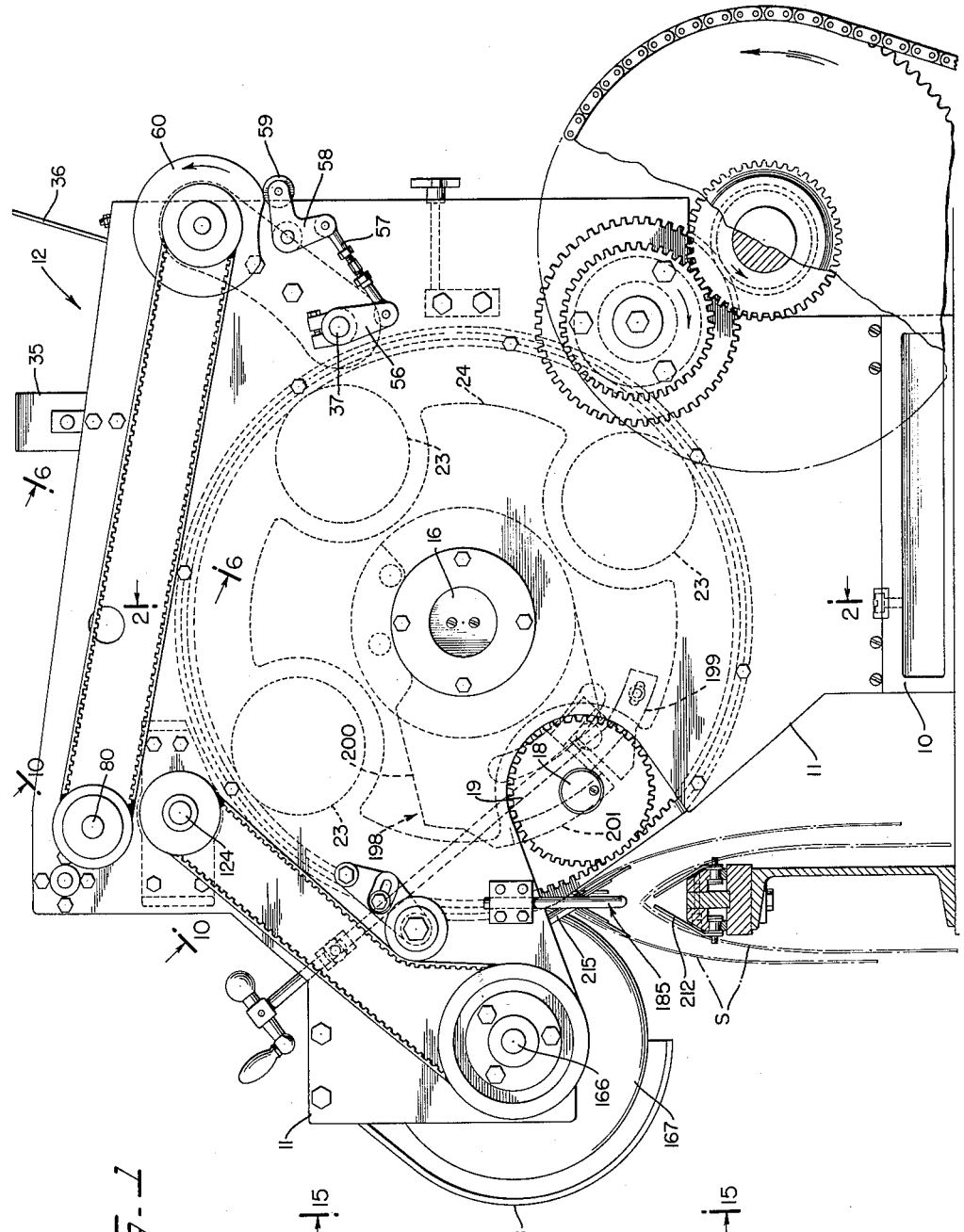
Figure 15:
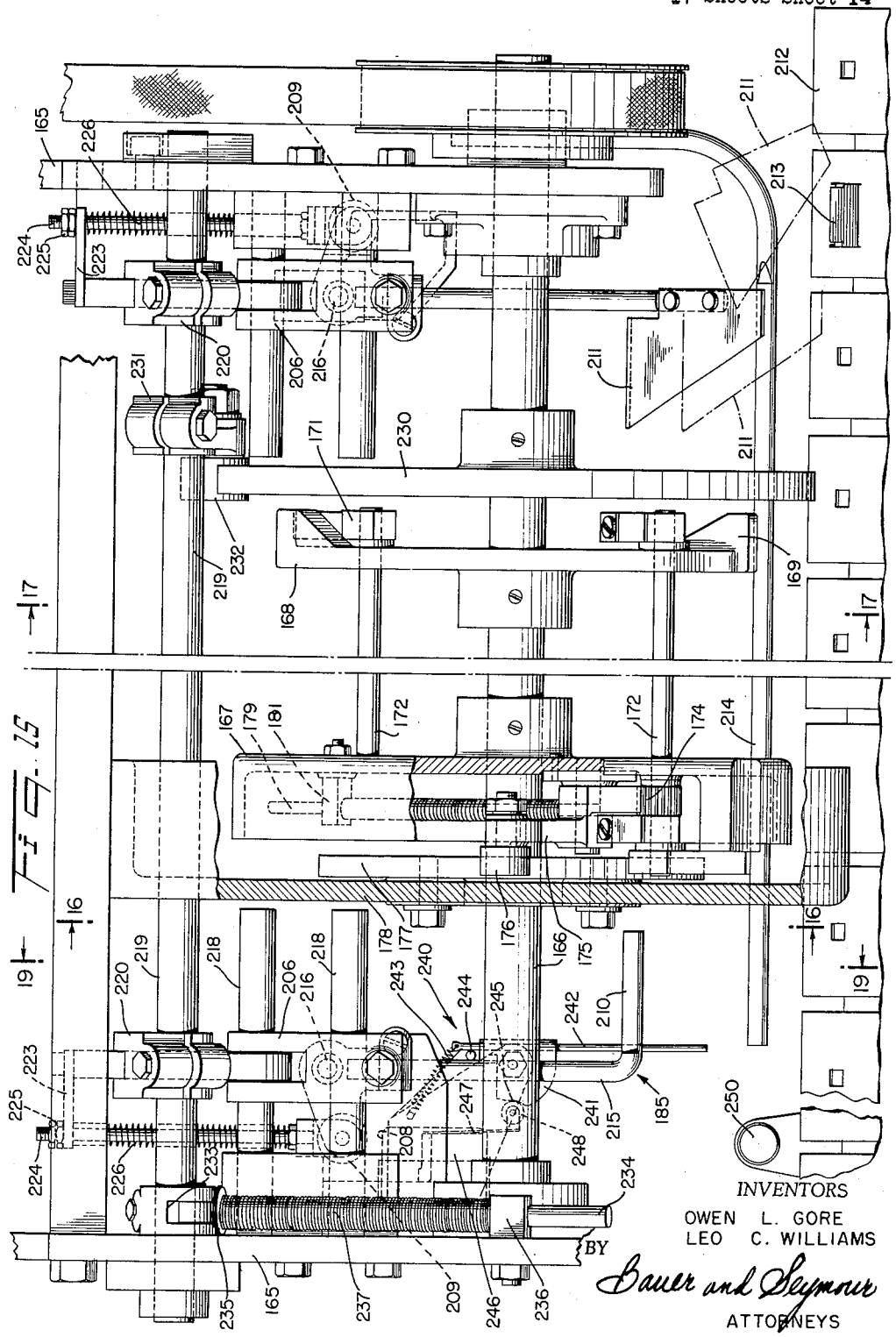
Figure 16:
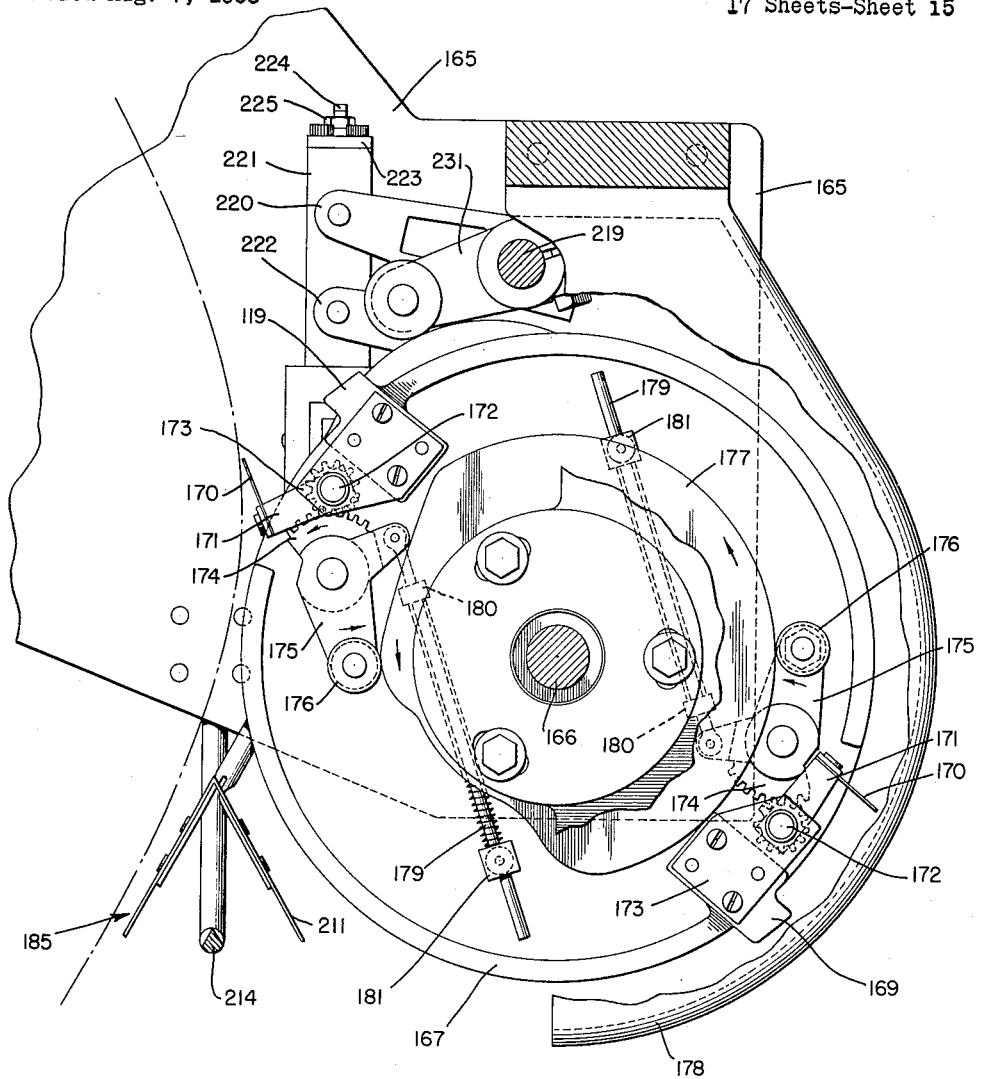

FIG. 15. is a cross sectional view taken on line 15—15 of FIG. 1 showing the signature leaf spreading means, the auxiliary saddle and the pick-off saddle mechanism;

FIG. 16 is a side elevational view taken on line 16—16 of FIG. 15 and showing another of the mechanisms for gripping a leaf of a signature and spreading it away from the other leaf;

FIG. 17 is a side elevational view taken on line 17—17 of FIG. 15 showing the mechanism for operating the auxiliary saddle;

FIG. 18 is a top plan view taken on line 18—18 of FIG. 17;

FIG. 19 is a side elevational view taken on line 19—19 of FIG. 15 showing the one end of the auxiliary saddle and the switch mechanism for detecting the absence of a signature on the auxiliary saddle;

FIG. 20 is a top plan view taken on line 20—20 of FIG. 19; and

FIG. 21 is a side elevational view of the adjustable cam shown in FIG. 1 and which controls the operation of the signature leaf grippers shown in FIGS. 3 and 4.

Referring to the drawings, one form of a signature handling and feeding mechanism constructed and operated in accordance with the present invention is herein illustrated as being embodied in a signature collating apparatus of new and improved construction wherein printed signatures are removed from a hopper one at a time and delivered straddlewise upon a saddle type conveyor. A plurality of the new and improved feeding mechanisms are generally arranged in spaced tandem relation, the moving conveyor receives a plurality of signatures from different feeding mechanisms, one at a time and one above the other, into groups to form complete books, magazines or the like and ready for stitching or binding. For the sake of simplicity and brevity in illustrating and describing the present invention, and since all of the feeders are identical in construction, arrangement and operation, only one of said feeders is illustrated.

In this specification such terms as front and back, upper and lower and the like are employed in a relative sense and are not intended as limitations as to position, direction and the like of various parts.

Referring to FIGS. 1–5, a base 10 supports a pair of spaced apart vertically extending plates 11 to which the various parts of the feeding mechanism are secured. Signatures S are stacked by hand or other means in a hopper 12. Beneath the hopper a plurality of rotating signature transfer means 13 are carried in a circular orbital path by a pair of discs 14 and 15 rotatably mounted on a shaft 16, the ends of which are mounted in suitable bearings in plates 11. Discs 14 and 15 are secured together by tie rods 17 and the outer periphery of discs 15 is provided with gear teeth by which the discs are rotated on shaft 16. While the transfer means 13 are carried in an orbital path by the discs about shaft 16, they are also independently rotated about shaft 18 by means of the engagement of gear 19 (FIG. 5) mounted on the shaft with the teeth of a large stationary internal gear 20.

The signature transfer means 13 (FIGS. 2 and 4) consists of a plurality of suction cups 21 mounted on the ends of supports 22 which, in turn, are mounted on the shaft 18. Suction cups 21 are mounted in axial alignment so that all engage and act at the same time upon the lowermost signature in the hopper near the folded edge thereof. Disposed between suction cups 21 and mounted for rotation with shaft 18 are a plurality of signature disc supports 23. Suction cups 21 grasp the lowermost signature in hopper 12 near the folded edge thereof and carry said edge in a planetary orbital path while the discs 23 support the leaves of the signature in its planetary orbital movement. Secured to shaft 16 and rotatable therewith are a pair of guide discs 24 having cut away portions 25 spaced apart from but conforming to the shape of discs 23 and the planetary path of suction cups 21 whereby the leaves of each signature are guided in their planetary orbital path and prevented from falling into the center of the feeder. As each set of suction cups 21 approaches the discharge end of hopper 12, suction is applied thereto in a manner hereinafter to be described and the folded edge of the lowermost signature is secured to the suction cups and as the suction cups are rotated in a clockwise direction, as viewed in FIG. 1, the signature is peeled from the hopper and wound around supports 23. The signatures are purposely stacked in the hopper so that all of the folded edges are at the same end of the hopper.

A plurality of rolls 26 are mounted on shafts 27, the ends of which are secured in suitable bearings in discs 14 and 15. Rolls 26 are carried in an orbital path by discs 14 and 15 and at the same time are independently rotated about their shafts 27 by means of the engagement of gear 28 with the teeth of stationary internal gear 20. Rolls 26 are mounted intermediate the sets of suction cups 21 and serve to support the weight of the signatures in the hopper. Because gears 28 and rolls 26 are of the same diameter, there is no slippage between the lowermost signature in the hopper and the rolls as the rolls pass beneath the hopper and no slippage as the lowermost signature is being removed from the bottom of the hopper in a peeling action.

In accordance with one aspect of this invention, there is shown in FIGS. 6 through 9 a new and improved mechanism for controlling the supply of signatures in a hopper and for supporting the folded edges of the signatures therein whereby the folded edge of the signatures are held out of engagement with the rollers 26 as they pass beneath the hopper 12 in their orbital and planetary paths of movement and at the same time at a desired height so the suction cups may properly engage the lowermost signature. The hopper 12 comprises side guides 35 secured to the upper ends of plates 11 and a plurality of concave fingers 36 against which the folded edges of the signatures are stacked either manually or by other suitable means. A shaft 37 is positioned forwardly of fingers 36 and has its ends freely rotatably secured in suitable bearings in a support means which extends across and is secured to plates 11. Secured to shaft 37 and movable therewith are a pair of lift fingers 38 and a pair of feeling fingers 39. Feeling fingers 39 are pivotally mounted to blocks 40 which are in turn securely fastened to shaft 37. It will be observed that the pivot point for finger 39 is located below and slightly forward of the center of shaft 37 as and for a purpose hereinafter to appear. One end of finger 39 has an upwardly extending portion 41 which extends into the path of the folded edge of the signatures in the hopper at the lower end of fingers 36 and has a rearwardly extending portion 42. Block 40 has a recessed opening 49 for slidably receiving a plunger 43 which also has a recessed opening in the end which is mounted in opening 49. A spring 44 is mounted in the recessed opening in plunger 43 and is compressed therein by a pin 45 which is threadedly mounted in block 40. The tension on the spring 44 is therefor adjustable and the plunger is constantly urged downwardly against portion 42 of the feeling finger. A micro-switch 46 having a wand 47 is mounted for horizontal movement toward and away from the finger portion 42 so that the vertical distance between the end of the wand 47 and the finger portion 42 may be adjustably selected. When a supply of signatures bears against finger portion 41, portion 42 is pivotally moved upwardly against plunger 43 and the compressive force of spring 44 and the portion 42 is held out of contact with the wand on the micro-switch. However, should no signatures bear against finger portion 41, the plunger 43 will push finger portion 42 downwardly which will in turn depress the end of wand 47 and activate the micro-switch. Since the vertical distance between the finger portion 42 and wand 47 can be adjusted, it is easily seen that the point above the normal pile level that the feeder will actuate the pile feed mechanism can be selectively controlled by the horizontal movement of the micro-switch.

In the disclosed embodiment there are two feeling fingers with micro-switches for each as described above. There are also a pair of feed chains 55, one associated with one feeler and micro-switch and the other associated with the other feeler and micro-switch. Both pile feed chains are connected to and driven from the same source of power but each has its own magnetic clutch which is independently controlled by the feeling finger associated therewith. Each of the pile feed chains has affixed to it a plurality of saw-toothed shaped grippers which extend outwardly from the chain. The upper reaches of the pile feed chains and grippers extend between finger 36 and engage the folded edges of the signatures to partially support the same in the hopper and at the same time to provide a means for moving the signatures downwardly in the hopper when the chains are rotated. A constant supply of signature folds is thus always bearing against finger portion 41. It will be noted that while the chain is stationary, the folded edges of the signatures in the hopper are supported in part by the grippers on the chain. However, as shown in FIG. 8, the upper reaches of the chains pass below fingers 36 at a point near the lower end of the fingers so that the signatures in the hopper below that point are resting solely against the fingers 36 and are supported by the finger portions 41 of the feeling finger. In this manner, the number of signatures supported by the feeling finger is limited. When the supply of signature folded edges bearing against the finger portion 41 is depleted, finger 39 is pivoted under the pressure of spring 44 to move portion 42 into contact with the wand 47 which in turn actuates the micro-switch which causes the magnetic clutch of a feed chain to be engaged and to feed signatures downwardly in the hopper. It is to be noted that each finger portion independently controls a feed chain so that both sides of the signatures in the hopper will be evenly supplied to the feed position and the danger that the suction cups will engage only one side of the lowermost signature is avoided. Lift fingers 38 are positioned outwardly from feeler fingers 39 and along shaft 37 and are adapted to hold the corners of the folded edges to prevent them from sagging downwardly into the orbital path of movement of the rollers 26. Lift fingers 38 are secured to the upper surface of a block 48 which is in turn fixedly secured to shaft 37 and rotatable therewith.

The movement of the feeling fingers and the lift fingers to remove them out of the path of the signature for feeding thereof is accomplished by the oscillating rotation of shaft 37. The oscillating rotation of shaft 37 is accomplished by means of the following mechanisms, as shown in FIG. 9. One end of shaft 37 extends through plate 11 and has secured thereto a lever 56. A rod 57 connects one end of lever 56 to one arm of a pivotally mounted bell crank 58. The other arm of the bell crank carries a cam follower 59 which contacts and follows the contour of a cam 60. Shaft 37 is constantly urged in a clockwise direction, as viewed in FIG. 9, thereby urging follower 59 into contact with cam 60 by means of a spring loaded lever 61 secured to shaft 37. As shown in FIG. 8, lever 61 is bifurcated at the end surrounding shaft 37 and straddles the block 48 which supports a lift finger 38 at one side of the pile support. A rod 62 is pivotally secured to the other end of lever 61 and slidably passes through an aperture in a stationary guide 63. A spring 64 is telescopically mounted over the end of rod 62 and is adjustably retained by a nut 65 which is threadedly engaged to the end of rod 62. The spring is thus compressed and retained between nut 65 and bracket 63 which pushes rod 62 downwardly and which in turn rotates shaft 37 in a clockwise direction thereby, as described above, urging cam follower 59 into engagement with cam 60. Cam 60 is driven by a series of belts and gears from the same source of power which drives discs 14 and 15. Cam 60 has a configuration and is rotated at the proper speed so that as the suction cups 21 are carried in their orbital and planetary paths into operational range of the folded edge of the lowermost sheet in the hopper, the shaft 37 is rotated counterclockwise for a brief interval and then returned to its original position. The oscillating rotation of shaft 37 carries with it the rotation of blocks 40 and 48 and the lift fingers 38 and feeling fingers 39. It will be noted that as block 40 is oscillated, the pivot point for finger 39 is moved upwardly and to the rear, as shown in FIG. 7, so that the entire finger portion 42 is carried upwardly and away from the wand. In this manner, the movement of finger 39 out of the path of the signatures in the hopper will not actuate the micro-switch 46. By the same token, the oscillation of shaft 37 will also cause the lift fingers 38 to be moved out of the downward path of movement of the signatures in the hopper so that the suction cups 21 will grip the folded edge of the lowermost signature in the pile near the folded edge. As soon as the folded edge of the lowermost signature has been gripped by the suction cups 21 and pulled downwardly into the planetary orbital path, the lift fingers 38 and feeling fingers 39 are returned to their normal positions, as shown in FIG. 7, where they support the folded edges of the remaining signatures in the stack until the orbital approach of the succeeding set of suckers whereby the above operations are repeated.

Figure 12:
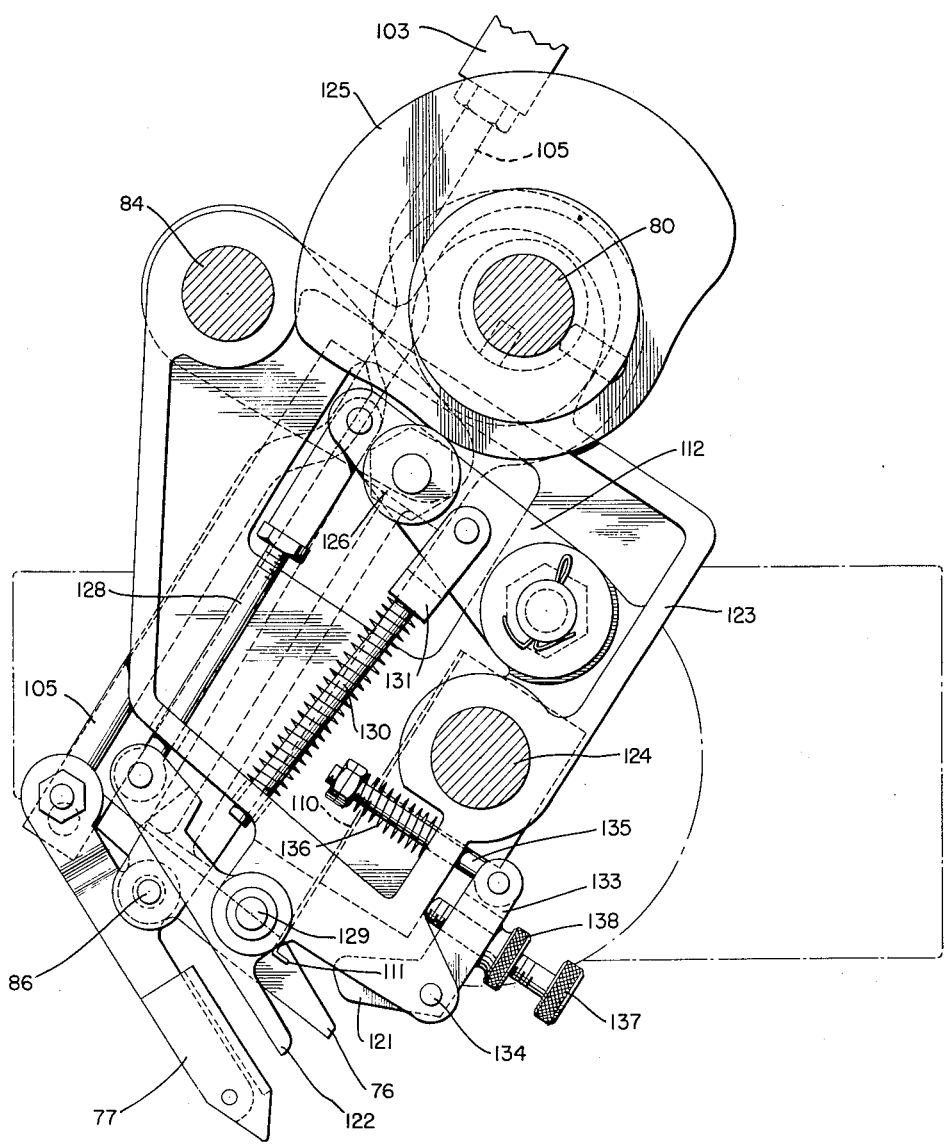
FIG. 12 is a side elevational view of the signature holding mechanism taken along line 12—12 of FIG. 10.

The mechanism for straightening each signature as it is removed from the transfer feeders 13 is shown in FIGS. 10 through 12. Mounted to plates 11 and in close proximity to the orbital path of travel of the transfer means 13 are a pair of signature straightening grippers 75 for gripping the folded edge of the signature held by suction cups 21. Grippers 75 are positioned to grip each side of the signature folded edge and since each are of identical construction and operation, a description of one will be sufficient for an understanding of the function and operation of both. Gripper 75 has an upper jaw 76 and a lower jaw 77, both being pivotally connected at 86 to the lower end of a lever 78. The upper end of lever 78 is loosely mounted to an eccentric hub 79 and hub 79 is keyed to a driven shaft 80. The ends of shaft 80 are journalled in suitable bearings in plates 11 and are driven by means of a suitable train of gears by the gear on disc 15. A lever 81 has a bifurcated portion 82 at one end which straddles the upper end of lever 78 and is pivotally connected thereto at 83. The opposite end of lever 81 is mounted for pivotal movement about a stationary shaft 84 which has its end portions mounted in plates 11. A bar 85 is mounted parallel to lever 78 with its upper end pivotally secured to lever 81 intermediate its ends and its lower ends pivotally connected to the rear of jaw 76. As shown in FIG. 1, as shaft 80 and eccentric hub 79 are rotated, pivot point 86 and jaws 76 and 77 will be carried in an elliptical path of movement in a vertical plane with the upper jaw 76 mounted between pivot point 86 and the rear portion mounted to the lower end of bar 85. Jaw 77 is pivotally movable about point 86 so that its front portion is movable into and out of gripping engagement with the front portion of jaw 76. The pivotal gripping movement of jaw 77 is controlled by the following mechanism. Secured to shaft 80 for rotation therewith is a cam 90. A cam follower 91 is rotatably mounted in one end of a lever 92 which is fixedly secured to a rotatable shaft 93 by suitable means. The ends of shaft 93 are mounted in bearings in plates 11 so that the shaft is freely rotatable as hereinafter described. Cam follower 91 is constantly held in contact with cam 90 by biasing shaft 93 in a clockwise direction, as viewed in FIG. 11. In the described embodiment, the biasing of shaft 93 is accomplished by the following mechanism. A rod 94 having a collar 95 is pivotally connected at its upper end to the end of lever 92 and has its lower end slidably mounted into a suitable opening in a block 97. A spring 98 under compression is telescopically mounted about rod 94 between collar 95 and block 97. The spring pushes rod 94 and the end of lever 92 upwardly so that shaft 93 is urged in a clockwise direction and a constant contact between follower 91 and cam 90 is assured. As the follower 91 follows the contour of cam 90, shaft 93 is correspondingly oscillated. Also fixedly secured to shaft 93 and movable therewith is a gripper lever 99 having a rearwardly and upwardly extending flange 100. Pivotally connected to the front portion 101 of lever 99 is a bell crank 102 having legs 103 and 104. Pivotally connected to the end of leg 103 is a connecting rod 105 the lower end of which is pivotally connected to the rear of jaw 77. A rod 107 is pivotally connected at one end to leg 104 and has its other end slidably mounted in an aperture in flange 100. Nuts 106 prevent this end of the rod from being removed from the aperture in flange 100. A spring 109 is telescopically mounted over rod 107 and is held in a compressed state between flange 100 and adjustable nuts 108 which are threadedly secured to rod 107 near its pivotal connection. Nuts 108 can be adjusted along rod 107 to control the amount of pressure which jaw 77 exerts upon jaw 75 when they are in closed position. Mounted forwardly of gripper lever 78 is a straightening plate 110 having at its lower end a portion 111 bent at an angle thereto. Plate 110 has an aperture 112 extending from end portion 111 into the body thereof of sufficient width and depth to permit grippers 75 to freely pass in their vertical elliptical path of movement as described above. In operation, the grippers 75 will move in a downward and forward direction toward a folded edge of a signature with jaws 76 and 77 open and into the orbital and planetary paths of a signature transfer means 13. When the folded edge of the signature passes into the opened jaws of grippers 75, jaw 77 is pivotally moved into gripping engagement with said folded edge. Simultaneously with the gripping of the folded edge, the grippers 75 are lifted upwardly and to the rear and then pass through aperture 112 in guide plates 110. As the folded edge of the signature comes into contact with guide plates 110, the folded edge is squared with the guides and remains in contact with the guides as the grippers continue their orbital movement and are pulled free of the signature. It is to be noted that the pressure of the grippers 75 on the folded edge of a signature is not great enough to damage a signature while it is being pulled free and yet sufficient to grip and hold the signature as it is removed from the transfer means 13 and moved into contact with the guide plates. A holding gripper 129 is located between grippers 75 and positioned in the same horizontal plane as the guides 110 to grip the folded edge of the signature after it has been squared with the guides and as the grippers 75 are pulled out of engagement with the folded edge of the signature.

Holding gripper 120 consists of a stationary resiliently mounted pad 121 and a movable jaw 122. The holding gripper 120 is mounted on a frame 123 which is stationarily mounted on shafts 80, 84 and 124. Fixedly secured to shaft 80 and adjacent frame 123 is a cam 125. A cam follower 126 is rotatably mounted to a lever 127. Lever 127 is pivotally connected at one end to the frame 123 and has the upper end of a connecting rod 128 pivotally secured to its other end. The lower end of connecting rod 128 is pivotally secured to the rear portion of movable jaw 122. Jaw 122 is pivotally mounted to frame 123 at 129. Thus, jaw 122 is movable toward and away from pad 121 as 126 follows the contour of cam 125. A rod 130 is pivotally connected at its upper end to lever 127 and has its lower end slidably mounted in a suitable opening in frame 123. A spring 132 is telescopically mounted under compression over rod 130, and has one end bearing against the frame 123 and its other end bearing against the shoulder 131 to constantly urge lever 127 upwardly so that the follower 126 will constantly remain in contact with and follow the contour of the cam 125. The pad 121 is mounted on one leg of a bell crank 133 which is pivotally connected to 123 and 134. A rod 135 is pivotally connected to the other leg of the bell crank and passes through an aperture in frame 123. A nut threadedly secured to the end of rod 135 holds and compresses a spring 136 telescopically mounted over the end of the rod so that the pad 121 mounted on the bell crank 133 is constantly urged downwardly or counterclockwise, as viewed in FIG. 12. A screw 137 is threadedly secured through a leg of the bell crank and bears against the frame 123 and thereby limits the pivotal movement of the bell crank. A suitable locking nut 138 holds screw 137 in its adjusted position. Thus, the gripping pressure between pad 121 and movable jaw 122 can easily be adjusted for various thicknesses of signatures.

Figure 13:
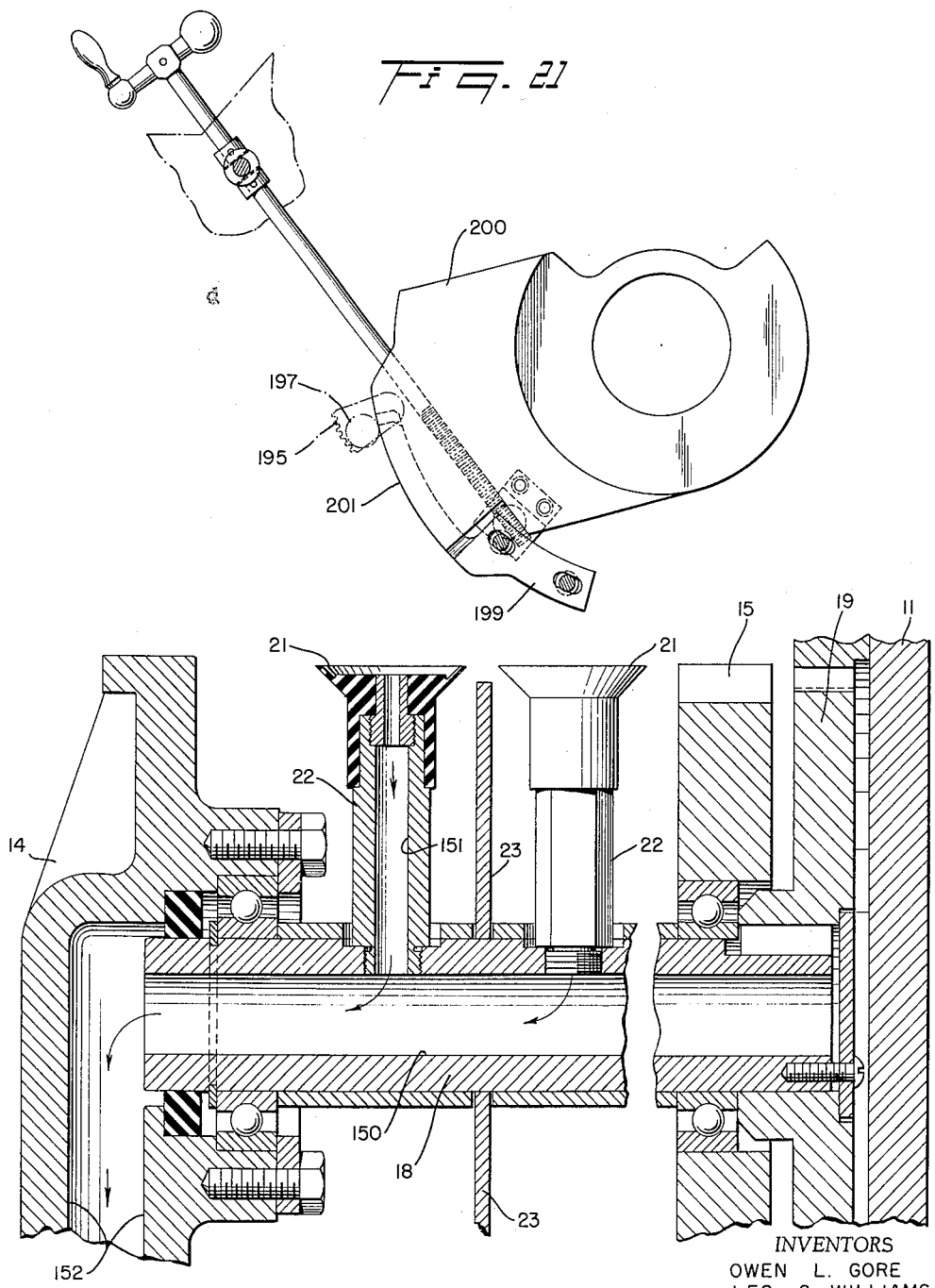
FIG. 13 is a cross sectional view of the suction cup transfer means showing the vacuum lines by which air is evacuated from the suction cups.
Figure 14:
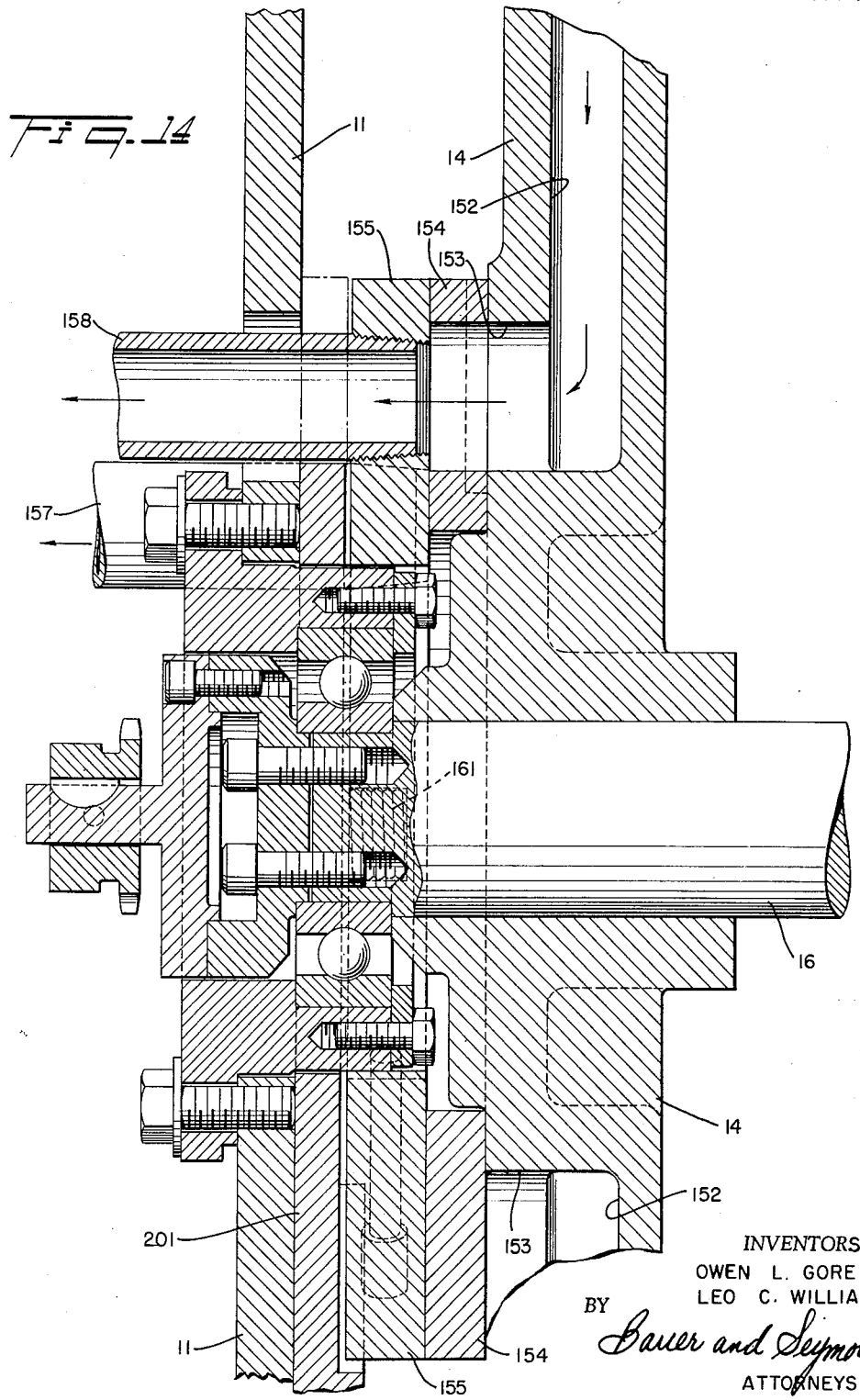
FIG. 14 is a cross sectional view taken on line 14—14 of FIG. 3 showing the connection between the fixed and rotatable means for evacuating air from the suction cups.

FIGURES 3, 13 and 14 show the means by which the suction is controlled and applied to suction cups 21. The shaft 18 has an aperture 150 through its center. Suction cup supports 22 have apertures 151 connecting with aperture 150 and with the suction cups. Disc 14 has radially extending channels 152 formed on its inner surface. The upper end of each channel 152 is connected with aperture 150. The lower end of each channel 152 extends through the outer surface of disc 14 at openings 153. An annular ring member 154 made of a relatively soft material such as graphite is mounted to a face of a steel ring 155 and both rings are mounted about one end of shaft 16 in such a manner that the graphite ring is adjacent the rotating disc 14 and is prevented from rotating with the disc but capable of moving in a horizontal plane. Recessed into the face of ring 154 which is adjacent the disc 14 are two arcuately shaped chambers 156 and 157. A hose 158 connects chamber 156 with a source of vacuum and a hose 159 connects chamber 157 with another source of vacuum. Each of chambers 156 and 157 are connected to different sources of vacuum so that vacuum will not accidently be lost in both chambers should something happen to one source. Furthermore, in the disclosed embodiment, it is desired to have a greater vacuum in chamber 156 than in chamber 157 so that a very strong vacuum exists in the suction cups while the signature is being removed from the hopper. A suitable vent aperture 160 extends through rings 154 and 155 and to the atmosphere whereby the vacuum is completely removed from the suction cups. Compressed spring members 161 are recessed into the outer face of ring 155 and bear against plate 11, thus urging ring 154 into tight fit against rotating disc 15 and more specifically a tight fit between the outer face of disc 15 adjacent aperture 153 and ring 154. As viewed in FIG. 3, the apertures 153 which are connected by passages to sets of suction cups 21 are rotated in a clockwise direction. As each set of suction cups approaches the folded edge of the signatures in the hopper, the aperture 153 for that set comes into register with chamber 156 in ring 154 and suction is applied to all of the suction cups. Suction is maintained in that set of suction cups while they are being moved in an orbital path and maintained in registry with chambers 156 and 157 and until the aperture registers with the vent hold 160 where the suction cups are vented to the atmosphere. The vent 160 is positioned along the orbital path of said suction cups to correspond to the position wherein the signature straightening grippers 75 contact the folded edge of the signature and remove it from the transfer means 13. It will be noted, as shown in FIG. 3, that as the aperture 153 moves out of registry with the chamber 157, there is a brief period in which the opening 153 is not in contact with either chamber 157 or vent 160. At this point the vacuum is cut off from the set of suction cups connected thereto while the vacuum in the suction cups is retained. Aperture 153 then moves into registry with the vent 160 and all vacuum is removed from the suction cups.

As the folded edge of the signature in transfer means 13 is gripped by the grippers 75 and lifted out of the transfer means and into engagement with the straightened plate 110, the body of the signature is peeled out of the transfer means as it continues to move in its orbital path thus leaving the signature leaves resting along a plane which is tangent to the rotating and orbitally moving rolls 26. In the disclosed embodiment, the signatures are so fed to the transfer means that the longer leaf of the signature is positioned adjacent the plane which is tangent to the rolls 26 after the signature has been removed from the transfer means and is held by the holding gripper 120. A plurality of grippers 186 are mounted on shafts 27 and are movable in an orbital path with rolls 26 and discs 14 and 15. These grippers are constructed and operated to grip the end of the longer leaf of the signature as it moves in its orbital path whereby the signature will be pulled out of the holding gripper 120 and moved downwardly toward the signature receiving means or saddle. Each of the grippers 186 are identical in construction and operation and therefore a description of one will be sufficient for all. Gripper 186 comprises a body portion 187 which is mounted upon two adjacent shafts 27, as shown in FIG. 4. Pivotally mounted to body 187 at 188 is a lever 189 having a rear portion 190 and a gripper surface 191. A shaft 192 is rotatably mounted in body 187 and has fixedly secured thereto a finger 193. Also fixedly secured to shaft 192 is a gear 194 (see FIG. 3) which is in engagement with a segment gear 195. Segment gear 195 is pivotally mounted at 196 and has mounted thereon a cam follower 197 which cooperates with cam 198, as shown in FIGS. 1 and 21. As shown more clearly in FIG. 21, cam 198 consists of a stationary cam portion 199 and an adjustable portion 200 whereby the surface 201 may be lengthened or shortened. Thus, the point at which the grippers are opened in their orbital path may be adjustably controlled depending upon the length of the signature being held in the holding gripper 120. When the cam follower 197 rides up onto surface 201 of cam 198, it carries with it segment gear 195 which meshes with and turns gear 194 and shaft 192 in a counterclockwise direction, as shown in FIG. 3. Shaft 192 is secured to gear 194 and movable finger 193 is secured to shaft 192 so that the counterclockwise movement of the shaft will move gripper finger 193 into engagement with gripping surface 191. The gripping pressure between surface 191 and finger 193 is maintained and controlled by means of a rod 202 having one end pivotally connected to 190 of lever 189 and the other end freely passing thru an aperture in frame 187. A spring 203 is telescopically mounted over one end of the rod and abuts the frame at one end and has suitable nuts threadedly secured to the end of the rod. Thus, as rod 202 is forced upwardly by spring 203, lever 189 is pivotally moved to force the surface 191 into firmer contact with finger 193. A screw 204 is threadedly mounted through frame 187 and has its end portion in contact with the top surface of portion 190 of lever 189. The pressure between surface 191 and finger 192 can thus be adjustably selected by means of screw 204. As shown in FIG. 1, the closing movement of the finger 193 occurs when the gripper is orbitally moved into proximity to the end of the longer leaf of the signature being held by the holding gripper 120 so that when the finger 193 closes upon the gripping surface 191 it will grip a leaf of the signature therebetween. As soon as the cam follower reaches the end of surface 201, the gripper is opened and the leaf is released. It will be noted in FIG. 4 that the gripping surface of gripper 186 lies slightly below a plane which is tangent to the tops of rollers 26 and which is the plane in which the leaves of the signature are supported as they are held in the holding gripper 120. Thus, it will be seen that the edge of the longer leaf of the signature which is gripped by the grippers is pulled slightly away from the other leaf at the point of gripping so that a finger 170 can be inserted to aid in separating the leaves so that the signature may be mounted in straddling fashion on a saddle.

As shown in FIG. 1, the plates 11 have forwardly extending portions 165 which serve to support the signature pick-off reel and saddle assembly. The shaft 166 having its ends mounted in suitable bearings in extension portions 165 is driven in timed relation to the rotation of the discs 14 and 15 by a series of chain and belt drives. Fixedly secured to shaft 166 and rotatable therewith are spaced apart discs 167 and 168. Adjustably mounted on the periphery of discs 167 and 168 are a pair of gripper pads 169 spaced approximately 180 degrees from each other on each disc. Operatively associated with each of the gripper pads is a movable finger 170 adapted to move the shorter leaf of the signature into gripping engagement with the gripper pad 169. Each finger 170 is secured to a lever 171 which in turn is fixedly secured to a shaft 172. Also fixedly secured to shaft 172 is a gear 173 which meshes with and is operated by a segment gear 174. Each shaft 172 has its ends rotatably mounted in discs 167 and 168 and upon rotation will move the fingers 170 mounted thereon, said fingers being in the proximity of a corresponding gripper pad 169 on the peripheral surface of each disc. Segment gear 174 is mounted on the bell crank 175 which has a cam follower mounted on one leg thereof. Pivotally mounted to the other end of bell crank 175 is a rod 179 having a collar 180 and having the lower end of the rod slidably mounted in a shaft support 181. A compressed spring 182 is telescopically mounted over rod 179 between the collar 180 and the support 181 thus pivoting bell crank 175 and constantly urging the follower 176 into contact with cam 177. The movement of finger 170 is controlled by the contour of the cam 177. As the fingers 170 move from opened to closed position, they are orbitally moved in timed relation to the orbital movement of the grippers 186 in such a manner that the end of each finger will pass adjacent the gripping surface of gripper 186 and, hence, will be moved into the area where the longer leaf and the shorter leaf of the signature have been separated by the gripper as above described. As the finger 170 continues its closing path it moves upwardly between the signature leaves and grips the end of the shorter leaf between finger 170 and the gripper pad 169. As the grippers 186 and the fingers 170 move in their respective orbital paths, the leaves of the signatures are spread apart. The mechanism for opening the grippers 186 and the fingers 170 are timed in relation to each other to operate so that both leaves of the signature are released at the same time, thus permitting the signature to drop downwardly in a spread apart position onto the auxiliary saddle 185.

The auxiliary saddle 185 is located in a position to receive the signature and hold the same at the folded edge with the leaves depending downwardly on each side thereof. As shown in FIG. 15, the auxiliary saddle consists of a short horizontally extending and generally triangular member 210 and a spaced apart short horizontally extending V-shaped support 211 so positioned that they support the end portions of each signature at the fold thereof and hold the same from further downward movement. As most clearly shown in FIG. 19, a saddle type conveyor 212 extends under the auxiliary saddle 185 and has a plurality of fingers 213 extending outwardly from the surface of the conveyor and adapted to engage the end of a signature and move the same along the conveyor. Positioned in a vertical plane between the auxiliary saddle 185 and the conveyor 212 is a pick-off saddle 214. As shown in FIG. 19, a signature positioned on auxiliary saddle 185 will have its leaves extending downwardly over the conveyor and because of the spreading effect of V-shaped support 211 of the auxiliary saddle the leaves will be out of operational contact with the fingers 213 on the conveyor. However, when a signature is released from the auxiliary saddle 185, it will drop down onto the pick-off saddle 214 and the fingers 213 of the conveyor will push against the edge of the signature, thus removing it from the saddle 214 and onto the saddle conveyor 212. A signature resting on the auxiliary saddle 185 is released therefrom by causing the saddle members 210 and 211 to be moved downwardly and outwardly away from each other, as indicated by the phantom lines in FIG. 15. The mechanism for supporting and moving members 210 and 211 are identical and therefore a description of one will be sufficient for an understanding of both.

The auxiliary saddle portion 210 has an upwardly extending rod portion 215 which is secured at the upper end to one leg of a bell crank 216. Bell crank 216 is pivotally mounted to a bifurcated portion 217 of a vertically disposed plate 221. As shown in FIG. 19, plate 221 is held in the vertical position by a pair of levers 220 and 222. Lever 220 is pivotally secured to plate 221 at one end thereof and fixedly secured at the other end to a rotatably oscillatable shaft 219 which has its ends mounted in suitable bearings in plates 165 and is free rotatably therein. Lever 222 is pivotally mounted at one end to the plate 221 and pivotally mounted at the other end to one of a pair of shafts 218. Thus, as the shaft 219 is oscillatably rotated, the plate 221 will be moved up and down in a vertical plane and lever 222 will act as a guide to hold the plate in a vertical plane. Shafts 218 are secured at one end thereof to plate 165 and extend outwardly therefrom, as shown in FIG. 15. A bracket 206 is mounted to the shafts 218 and has a rearwardly extending horizontal surface 207 and a vertically extending shelf 208 which serves a purpose hereinafter to be described. The other leg of bell crank 216 is bifurcated and has mounted therein a roller 209 and the lower end of a rod 224. The upper end of rod 224 freely passes through an aperture in a horizontal plate 223 which is fixedly secured at one end thereof to the top of plate 221. A spring 226 is compressed and telescopically mounted over the rod 224 between the plate 223 and the lower end of the rod. Suitable lock nuts 225 threadedly engage the upper end of the rod. As shown in FIG. 15, the compressed spring 226 will constantly urge the rod 224 downwardly until lock nuts 225 are in contact with the upper surface of plate 223 and which will in turn pivotally move the other arm of the bell crank 216 and the auxiliary saddle connected thereto to the right and into operating position. As shaft 219 is rotated counterclockwise, as viewed in FIG. 19, the plate 221 together with the bell crank 216 and auxiliary saddle portion 210 will move vertically downwardly until roller 209 strikes the shelf 208. Upon continued downward movement, the bell crank leg which carries the saddle portion 210 will move to the left, as shown in FIG. 15, and out of the downward path of movement of the signatures. It will be seen that the auxiliary saddle will be first moved vertically downward and then the portions supporting the ends of the signature will move away from each other and out of the downward path of movement of the signatures allowing the signatures to freely fall downwardly onto the pick-off saddle 214. The controlled oscillating rotational movement of shaft 219 is accomplished by means of a cam 230 securely mounted on the driven shaft 166 and rotated therewith. As shown in FIG. 17, a lever 231 is fixedly secured at one end thereof to the shaft 219 and has a cam follower 232 rotatably mounted in the other end and in rolling contact with the outer surface of said cam. Thus, the shaft 219 will be oscillatably rotated in accordance with the movement of the lever 231 which movement is in turn controlled by the contour of the cam 230. In order to constantly urge the cam follower 232 into contact with the cam 230, there is provided a lever 233 which is securely fastened at one end of the shaft 219 (see FIG. 19). Pivotally secured to the other end of lever 233 is a rod 234 having a shoulder 235. The lower end of rod 234 slidably extends through an aperture in bracket 236 which is fixed to the plate 165. A compressed spring 37 is telescopically mounted over rod 234 with one end bearing against bracket 236 and the other end against shoulder 235 to constantly urge the rod upwardly. By this means, shaft 219 is constantly urged in a clockwise rotational direction, as viewed in FIG. 19, and the follower 232 is constantly urged into contact with the cam 230. As set forth above, the auxiliary saddle portions 210 and 211 first move vertically downwardly and then are moved outwardly away from each other and out of the downward path of movement of the signature whereby the signature is free to fall downwardly onto the pick-off saddle 214. The vertical downward movement of the auxiliary saddle portions 210 and 211 are so timed that a signature is mounted thereon while the saddle portions are in their downward movement. Thus, the impact of the free falling signature is minimized and the possibility of a signature tearing at the folded portion as it is mounted on the auxiliary saddle is greatly reduced.

Mounted adjacent the auxiliary saddle portion 210 is a stripper and automatic stop mechanism 240, as shown in FIGS. 15, 19 and 20. The stripper and automatic stop mechanism comprises a bell crank 241 pivotally mounted at the outer end of bracket 206. A rod 242 extends through one leg of the bell crank with the lower end of the rod vertically extending downwardly past auxiliary saddle portion 210. A spring 243 is secured to the upper end of the rod and pulls the same into contact with a pin 244 which is mounted in the end of bracket 206. Thus, the rod 242, as shown in FIG. 15, is constantly held in a vertical position and parallel to the downward path of movement of the signatures. A cam surface 245 is affixed to the other leg of the bell crank. A cut-off switch 246 is mounted to the frame 165 and has a spring loaded wand 247 and a roller 248 mounted to the end of the wand and held in operational contact with the cam 245. In the normal operation of the auxiliary saddle, the signatures sometimes move to the left, as viewed in FIG. 15, after they are mounted on the auxiliary saddle due to the fact that the leaves of the signatures on the auxiliary saddle are in frictional contact with the leaves of the signature on the pick-off saddle. As the conveyor 212 moves the signature on the pick-off saddle to the left, it may carry with it the signature on the auxiliary saddle. The tension of spring 243 is sufficient to overcome this resistance as the signature on the auxiliary saddle is moved into contact with the rod 242. However, should the signature on the auxiliary saddle become jammed or engaged with the legs 213 on the conveyor so that a greater than frictional resistance is set up, the lower end of rod 242 will be moved to the left. The movement of rod 242 will pivot the bell crank 241 which in turn will rotate the cam surface 245 and push the roller and wand 247 to the left for actuating the cut-off switch 246. Alternatively, instead of using the cut-off switch 246, a photoelectric eye 250 may be mounted to the left of the auxiliary saddle 185 and pick-off saddle 214 and slightly above the conveyor 212, as shown in FIG. 15. Thus, if any signature should become crumpled or for any other reason not be properly seated on the conveyor 12, it would actuate the photoelectric eye which in turn would cut off the machine. In this alternative construction, the rod 242 would be fixedly secured to the end of bracket 206 and would still serve the function of limiting the horizontal movement of a signature on the auxiliary saddle caused by any frictional contact with a signature mounted on the pick-off saddle and will strip the signature from the auxiliary saddle as it releases the signature mounted thereon.

The operation of the machine constructed in accordance with the present invention will be clearly understood from the foregoing description, and while said description and the accompanying drawings set forth with more or less particularity one embodiment of the invention, it is to be expressly understood that said invention is not limited to said embodiment. Various changes may be made therein, particularly in the design and arrangement of the parts illustrated, as well as in the mode of operation and manner of use, without departing from the spirit and scope of the invention, as will now be clear to those skilled in the art.

What is claimed is:

1. An apparatus for handling signatures comprising a signature transfer means, means for carrying the signature transfer means in an orbital path, means for driving the signature transfer means in a planetary orbital path, a hopper for receiving a supply of signatures with the discharge portion of said hopper in proximity to the orbital path of said signature transfer means whereby said transfer means will engage the folded edge of a signature and advance the same along the planetary orbital path of said transfer means, carrier means movable in an orbital path and located in proximity to the planetary orbit to grip the folded edge of the signature and carry the same away from said transfer means, a stationary straightening means positioned in the orbital path of said carrier means whereby said signature will be stripped from said carrier means and the folded edge thereof placed in operational contact with said straightening means, holding means to grip the folded edge of each signature deposited in alignment with said straightening means and to temporarily retain each signature stationary, first means movable in an orbital path for engaging one leaf of the signature and to carry said signature downwardly thereby disengaging the folded edge from its holding means, other means movable in an orbital path and in proximity to said first leaf engaging means for guiding the other leaf away from the one leaf, the engaging means for said one leaf and the guiding means for said other leaf being operable to simultaneously release said leaves whereby the signature will freely fall downwardly in a vertical plane with the leaf portions in a spread apart position.

2. Apparatus as set forth in claim 1 including means to actuate said gripping means whereby the folded edge of the signature is gripped when the planetary orbital path of said folded edge coincides with the orbital path of said transfer means.

3. Apparatus as set forth in claim 1 wherein the signature transfer means comprises a plurality of suction means in axial alignment and mounted at a distance from their axis of rotation whereby all of said suction means act upon the folded edge of a signature when rotated into engagement therewith, means mounted on the axis of said suction means to support the signature as it is carried in the planetary orbital path of said transfer means, and means to guide the signature in its planetary orbital path.

4. Apparatus as set forth in claim 3, including a plurality of said signature transfer means carried along a common orbital path, and a plurality of rollers mounted on the means for carrying the signature transfer means in an orbital path, said rollers being disposed between each of said signature transfer means to support the stack of signatures in the hopper.

5. An apparatus for handling signatures and depositing the same in straddling fashion on a saddle comprising a hopper for receiving a supply stack of signatures, signature transfer means, means for carrying the signature transfer means in an orbital path, means for driving the signature transfer means in a planetary orbital path, rollers mounted on the signature transfer carrying means and movable in an orbital path in proximity to the bottom of the hopper to support the stack of signatures therein, movable means to support the bottom of the stack at an edge thereof out of the orbital path of said rollers, means to move said movable means out of engagement with said stack as said signature transfer means orbitally approaches said hopper and to return said support into engagement with said stack after said transfer means has engaged the lowermost signature and while said signature is being withdrawn from the hopper, carrier means to grip the folded edge of the signature and transport the same away from the transfer means, a fixed signature straightening means positioned in the path of said carrier means whereby said signature will be stripped from said carrier means and the folded edge thereof placed in operational contact with said straightening means, signature holding means operable to grip the folded edge after it has been straightened to temporarily retain each signature stationary, a first signature leaf gripping means mounted on the signature transfer carrying means and movable therewith and on one side of the saddle, means to actuate said first leaf gripping means to engage a leaf after the folded edge is gripped by said holding means and to pull the signature downwardly and out of the holding means, a second leaf gripping means mounted on a rotatable frame and movable in an orbital path on the other side of the saddle, means to actuate said second leaf gripping means and move the same between the leaves of the signature and move one leaf away from the other, means to independently release said first and second leaf gripping means in timed relation to each other so that the signature will freely fall straddlewise onto the saddle.

6. An apparatus for handling signatures comprising a hopper for receiving a supply stack of signatures, a signature transfer means, means for carrying the signature transfer means in an orbital path, means for driving the signature transfer means in a planetary orbital path, rollers mounted on the signature transfer carrying means and movable in an orbital path in proximity to the bottom of the hopper to support the signatures therein, movable means at the bottom of the hopper to support the signatures in the hopper at an edge thereof whereby said edge is held out of the orbital path of said rollers, means to pivotally move said signature edge support means out of engagement with said signatures as said signature transfer means orbitally approaches the hopper and to pivotally move said signature edge support means into engagement with said signatures after said transfer means has engaged the lowermost signature and while said lowermost signature is being withdrawn from the hopper.

7. An apparatus as set forth in claim 6 including means movable in an orbital path for engaging an edge of the signatures piled in said hopper for supporting and controlling the movement of said edges in the hopper.

8. An apparatus as set forth in claim 7 wherein said signature edge support means includes feeler means pivotally mounted for engagement with the lowermost supported edge of signatures in the hopper and pivotally movable about a first pivot point when no signatures are in contact therewith to actuate the signature edge engaging means whereby signatures are fed downwardly in the hopper, said feeler also being movable about a second pivot point whereby the signature edge engaging means is not actuated and whereby the feeler is moved out of the downward path of the lowermost signature in the hopper.

9. An apparatus as set forth in claim 6 including means for engaging an edge of the signatures piled on said hopper for supporting and controlling the downward movement of said edges in the hopper, and wherein the movable means at the bottom of the hopper includes a feeling means for actuating said signature edge engaging means when no signatures are in contact therewith, said feeling means being operational to actuate the signature edge engaging means only when the movable means at the bottom of the hopper is in a position for supporting an edge of the signatures in the hopper.

10. A signature stack supporting and feeding means comprising side guide members, an end guide against which one end of the stack abuts, means for supporting the bottom of the stack, means to engage the edge of the lowermost signature in the stack at the end which abuts the end guide and remove the same from the stack, pivotally mounted support means positioned adjacent the lower portion of said end guide for supporting the said edge of the stack which abuts said end guide, means to feed the stack of signatures downwardly, feed control means positioned adjacent the support means whereby said support means will actuate said stack feed means in the absence of signatures in contact with said support means.

11. A signature stack supporting and feeding means as set forth in claim 10 wherein said support means is pivotally movable about a first pivot point to actuate the stack feed means and pivotally movable about a second pivot point whereby the stack feed means is not actuated and whereby the support is moved out of engagement with the stack to permit the lowermost signature to be fed therefrom.

12. A signature stack supporting and feeding means as set forth in claim 10 wherein said movable support is pivotally movable out of engagement with said stack to permit the edge of the lowermost signature which abuts the end guide to be fed from the stack and without actuating said stack feeding means and pivotally movable into engagement with the signatures remaining in the stack while the lowermost signature is being removed from the stack.

13. A signature stack supporting and feeding means as set forth in claim 10 wherein said stack feed means comprises a plurality of signature engaging means movable in an orbital path and wherein a portion of said orbital path passes in proximity to a portion of the signatures abutting said end guide, said signature engaging means being operable in response to the absence of signatures in contact with said support means for moving signatures downwardly into contact with said feeler, and said signature engaging means acting to further support said signatures to prevent the same from moving downwardly except upon movement of said engaging means.

14. A signature stack supporting and feeding means as set forth in claim 13 comprising at least one support means and one stack feed means operable on each side of the signatures in said stack and wherein each stack feed means and its support means are independently operated so that the signatures are straightened and evenly fed downwardly in said stack.

15. A signature stack supporting and feeding means as set forth in claim 10 including a block mounted for pivotal movement and wherein said support means comprises a lever member having a forward portion positioned adjacent the lower portion of said end guide and a rear portion, said lever being pivotally connected to said block, adjustable resilient means to pivotally move the rear portion of said lever downwardly, said feed control comprising a switch means positioned within the downward path of the rear portion of said lever for actuating said signature feed means.

16. A signature stack supporting and feeding means as set forth in claim 15 wherein said switch means is mounted for horizontal adjustment toward and away from the rear portion of said lever whereby the lower level of the edges of the signatures in the stack is controlled.

17. An apparatus for handling signatures comprising a signature transfer means, means for carrying the signature transfer means in an orbital path, means for driving the signature transfer means in a planetary orbital path, a hopper for receiving a supply of signatures with the discharge portion of said hopper in proximity to the orbital path of said signature transfer means whereby said transfer means will engage the folded edge of a signature and advance the same along the planetary orbital path of said transfer means, signature gripping means movable in an orbital path to grip the folded edge of a signature and remove the same from said transfer means, a stationary straightening means positioned in the orbital path of said gripping means whereby said signature will be stripped from said gripping means and the folded edge thereof placed in operational contact with said straightening means, additional gripping means to engage and hold said folded edge temporarily stationary after it has been straightened, means to momentarily grip one of the leaves of the signature and move the signature downwardly out of said holding gripper and means operable simultaneously with the operation of the gripping means to open the other of the leaves of the signature whereby the leaves of said signature are spread apart and simultaneously released to freely fall straddlewise upon a saddle.

18. An apparatus as set forth in claim 17 wherein the orbital path of the means for gripping the folded edge intersects the orbital path of said signature transfer means.

19. An apparatus as set forth in claim 17 wherein said means for gripping the folded edge and traveling in said orbital path is timed to intersect the orbital path of the signature transfer means when the planetary path of said signature folded edge in the transfer means coincides with the orbital path of said signature transfer means.

20. An apparatus as set forth in claim 17 wherein said gripping means comprises a fixed gripper pad and a pivotally mounted jaw member movable toward and away from said pad, and means for controlling the movement of said jaw member as said gripping means is moved in its orbital path.

21. An apparatus as set forth in claim 17 wherein said straightening means comprises a plate for stripping the signature from the gripping means and wherein said plate is interposed in the orbital path of said gripper means.

22. An apparatus as set forth in claim 21 wherein the additional gripping means comprises an adjustable pressure pad and a pivotally mounted jaw member movable toward and away from said pad, and means for moving said jaw toward said pad after the signature has been straightened against said strippers.

23. In an apparatus for handling folded signatures, the combination of a signature feed means, means to grip the folded edge of a signature fed thereto, means to transport the gripping means in an orbital path away from the signature feed means and to move said folded edge into contact with a stripper plate whereby the folded edge is straightened as said grippers are stripped therefrom, a saddle member positioned adjacent said transport means and having its horizontal surface in alignment with said stripper plates, additional gripping means to grip and hold the folded edge after it has been straightened, and means to grip one of the leaves of the signature and move the signature downwardly out of the additional gripping means and additional means to open the other of said leaves of the signature into an inverted V-shape and to simultaneously release said signature whereby it may freely fall downwardly and be deposited straddlewise upon said saddle.

24. In an apparatus as set forth in claim 23 wherein said first-mentioned gripping means comprises a fixed gripper pad and a pivotally mounted jaw member movable toward and away from said pad, and means for controlling the movement of said jaw member as said gripper is being moved in said orbital path.

25. An apparatus as set forth in claim 24 wherein said means for controlling the movement of said jaw member comprises adjustable resilient means whereby the pressure that said jaw exerts against said gripper pad is controlled.

26. In an apparatus as set forth in claim 24 wherein the signature straightening means comprises a plate for stripping the signature from the gripper means and wherein said plate is interposed in the orbital path of said gripper means.

27. In an apparatus as set forth in claim 26 wherein the additional signature gripping means comprises an adjustable pressure pad and a pivotally mounted jaw member movable toward and away from said pad, and means for moving said jaw toward said pad after the signature has been straightened and before the first-mentioned gripping means have been stripped from said folded edge.

28. An apparatus for handling signatures and depositing the same in straddling fashion on a saddle comprising a signature transfer means, means for carrying the signature transfer means in an orbital path, means for driving the signature transfer means in a planetary orbital path, a hopper for receiving a supply of signatures with the discharge portion of said hopper in proximity to the orbital path of said signature transfer means whereby said transfer means will engage the folded edge of a signature and advance the same along the planetary orbital path of said transfer means, gripping means movable in a predetermined path which intersects the path of said transfer means to grip the folded edge of a signature and to carry the same away from said transfer means, stationary straightening means positioned in the path of said gripping means whereby said signature will be stripped from said gripping means and said folded signature edge is placed in operational contact with said straightening means, means for gripping said folded signature edge and holding the signature temporarily stationary after it has been straightened, a first leaf gripping means mounted on the signature transfer carrying means and movable in an orbital path therewith and on one side of the saddle, means to actuate said first leaf gripping means to engage one leaf of said signature and pull the signature downwardly and out of said holding means and to open said gripping means after a short orbital movement thereof, a second leaf moving means mounted on a rotatable frame and movable in an orbital path on the other side of said saddle and coacting with said first gripping means to move the second leaf away from said first leaf, means to actuate said second gripping means to engage the other signature leaf while the first mentioned leaf is held by said first gripping means and to deactivate said second leaf moving means after a short orbital movement thereof, the orbital movements of said leaf gripping and moving means causing the leaves to move away from each other and downwardly toward opposite sides of said saddle, and wherein the opening of said leaf gripping and moving means are timed to occur at the same time whereby the signature will be released and will freely fall straddle-wise onto said saddle.

29. An apparatus as set forth in claim 28 wherein said first signature leaf gripping means comprises a resiliently mounted pressure pad and a pivotally movable gripper jaw and adjustable cam means to actuate said jaw into engagement with said pressure pad to grip said signature and to actuate said jaw away from the pressure pad after an orbital movement of said gripping means whereby the signature is released.

30. An apparatus as set forth in claim 28 wherein said second gripping means comprises a pressure pad secured to said frame and movable into engagement with said pad, and cam means to impart a predetermined pivotal movement to said jaw as it is being moved in an orbital path.

31. The method of transferring a folded signature from a supply thereof to a straddlewise position on a signature receiving means comprising the steps of gripping the folded edge of a signature in said supply and moving said edge in an orbital path and simultaneously therewith through a planetary path, gripping the folded edge of said signature while moving in said orbital and planetary paths and removing the same from said supply grippers and moving the same through an orbital path and thereafter into engagement with signature straightening means, causing the straightened folded edge to be gripped simultaneously with the removal from the straightening gripper, engaging one leaf of the signature and pulling the same out of said holding grippers, and downwardly toward the signature receiving means, causing the leaves of the signature to be opened after being released from the signature holding means and freely fall downwardly in straddling fashion on said signature receiving means.

32. The method of transferring a folded signature from a supply thereof to a straddlewise position on a signature receiving means comprising the steps of controlling the folded edges of the signatures in the supply thereof so that the folded edge of the lowermost signature therein is retained within operational range of a signature transfer means and at the same time maintaining a supply of folded edges of signatures adjacent said lowermost signature so that only one signature at a time is permitted to be fed out of said supply, gripping the folded edge of the lowermost signature in said supply and transferring the same to a signature straightening and holding means by revolving said edge about an axis and revolving said first-named axis about a second axis, thereafter gripping the straightened folded edge and holding the same, gripping one of the leaves of said straightened signature and pulling the same out of said holding grippers and downwardly toward said signature receiving means, causing the leaves of said signature to be opened and deposited in straddling fashion on said signature receiving means.

33. In the method of feeding signatures to a conveying means comprising the steps of sequentially gripping the folded edge of signatures from a supply thereof and moving each said edge through a first predetermined path, moving each of said edges through a second predetermined path diametrically opposed to said first path, thereafter bringing each edge to a stop and squaring the same in relation to the conveyor, pulling each signature downwardly toward said conveyor and simultaneously opening each signature to an inverted V-shape and allowing the opened signature to fall onto the conveyor.

References Cited in the file of this patent

UNITED STATES PATENTS

| | | |
|---|---|---|
| Re. 21,489 | Kleineberg et al. | June 25, 1940 |
| 1,739,153 | Laxo et al. | Dec. 10, 1929 |
| 1,961,401 | Steinmann | June 5, 1934 |
| 2,219,608 | Ackley | Oct. 29, 1940 |
| 2,279,269 | Tornberg | Apr. 7, 1942 |
| 2,279,270 | Tornberg et al. | Apr. 7, 1942 |
| 2,413,358 | Kleineberg | Dec. 31, 1946 |
| 2,532,626 | Kleineberg | Dec. 5, 1950 |
| 2,568,604 | Bechberger | Sept. 18, 1951 |
| 2,599,776 | Peyrebrune | June 10, 1952 |
| 2,684,848 | Pearce | July 27, 1954 |
| 2,767,653 | Babicz | Oct. 23, 1956 |
| 2,903,260 | Faeber | Sept. 8, 1959 |

FOREIGN PATENTS

| | | |
|---|---|---|
| 813,482 | Germany | Nov. 4, 1952 |
| 775,833 | Great Britain | May 29, 1957 |